(12) United States Patent
Sudo et al.

(10) Patent No.: US 8,294,734 B2
(45) Date of Patent: Oct. 23, 2012

(54) IMAGE DISPLAY DEVICE, IMAGE DISPLAY METHOD, IMAGE DISPLAY SYSTEM, IMAGE DATA TRANSMITTING DEVICE, PROGRAM, AND STORAGE MEDIUM

(75) Inventors: Tatsuo Sudo, Chiba (JP); Takuya Kinoshita, Chiba (JP); Masafumi Takahashi, Sakura (JP); Soichi Nitta, Narashino (JP); Masafumi Hirata, Tokyo (JP); Aya Enatsu, Chiba (JP); Azusa Umemoto, Kizugawa (JP); Kiyotaka Kashito, Kobe (JP)

(73) Assignee: Sharp Kabushiki Kaisha, Osaka (JP)

( * ) Notice: Subject to any disclaimer, the term of this patent is extended or adjusted under 35 U.S.C. 154(b) by 1524 days.

(21) Appl. No.: 11/812,737

(22) Filed: Jun. 21, 2007

(65) Prior Publication Data

US 2008/0122734 A1 May 29, 2008

Related U.S. Application Data

(60) Provisional application No. 60/833,256, filed on Jul. 26, 2006.

(30) Foreign Application Priority Data

Jun. 23, 2006 (JP) .................................. 2006-174542

(51) Int. Cl.
*G09G 5/00* (2006.01)
(52) U.S. Cl. ........................................ 345/634; 345/670
(58) Field of Classification Search .................... 345/634
See application file for complete search history.

(56) References Cited

U.S. PATENT DOCUMENTS

| 7,443,418 | B2* | 10/2008 | Bryant et al. ............... 348/207.1 |
| 7,669,131 | B2* | 2/2010 | Matsuyama ................... 715/730 |
| 7,908,558 | B2* | 3/2011 | Obrador et al. ............... 715/730 |
| 2001/0033303 | A1 | 10/2001 | Anderson |
| 2002/0032696 | A1* | 3/2002 | Takiguchi et al. ......... 707/500.1 |
| 2002/0047869 | A1 | 4/2002 | Takiguchi |
| 2002/0070982 | A1 | 6/2002 | Hill et al. |
| 2002/0101829 | A1 | 8/2002 | Murai et al. |
| 2002/0135621 | A1 | 9/2002 | Angiulo et al. |
| 2002/0180879 | A1 | 12/2002 | Shiohara |

(Continued)

FOREIGN PATENT DOCUMENTS

CN 1685718 A 10/2005

(Continued)

OTHER PUBLICATIONS

European Search Report issued in European Patent Application No. 07745137.5 on Jun. 11, 2012.

*Primary Examiner* — M Good Johnson
(74) *Attorney, Agent, or Firm* — Birch, Stewart, Kolasch & Birch, LLP

(57) ABSTRACT

A control section of a slideshow display device includes a display control section. The display control section 115 causes a list of thumbnails to be displayed when a display timing at which a target image other than a currently displayed image is to be displayed comes before a predetermined point in time. As such, when display delay occurs, a list of thumbnails can be displayed, instead of the target image. This realizes an image display device which prevents a user from being subject to stress when display delay occurs in slideshow display.

7 Claims, 17 Drawing Sheets

U.S. PATENT DOCUMENTS

| | | |
|---|---|---|
| 2003/0009567 A1 | 1/2003 | Farouk |
| 2003/0090497 A1 | 5/2003 | Yoshioka |
| 2003/0189652 A1* | 10/2003 | Takayama ................. 348/231.99 |
| 2003/0197784 A1 | 10/2003 | Bae |
| 2003/0214529 A1 | 11/2003 | Martin, Jr. et al. |
| 2004/0107223 A1* | 6/2004 | Uno et al. ..................... 707/200 |
| 2004/0128308 A1 | 7/2004 | Obrador |
| 2004/0145764 A1 | 7/2004 | Machida et al. |
| 2004/0177327 A1 | 9/2004 | Kieffer |
| 2004/0210845 A1 | 10/2004 | Paul et al. |
| 2005/0044091 A1* | 2/2005 | Nakamura et al. ............ 707/100 |
| 2005/0210414 A1 | 9/2005 | Angiulo et al. |
| 2005/0259164 A1* | 11/2005 | Kudo .......................... 348/231.2 |
| 2006/0002701 A1* | 1/2006 | Takayama ..................... 396/287 |
| 2006/0007501 A1* | 1/2006 | Kawada ......................... 358/448 |
| 2006/0053468 A1 | 3/2006 | Sudoh et al. |
| 2006/0112413 A1 | 5/2006 | Ando et al. |
| 2006/0126088 A1 | 6/2006 | Inoue et al. |
| 2006/0164441 A1 | 7/2006 | Wada et al. |
| 2006/0187331 A1 | 8/2006 | Watanabe et al. |
| 2006/0188237 A1 | 8/2006 | Watanabe et al. |
| 2006/0265669 A1 | 11/2006 | Lee |
| 2006/0268121 A1 | 11/2006 | Watanabe |
| 2007/0088784 A1 | 4/2007 | Chiba et al. |
| 2008/0292212 A1* | 11/2008 | Ozaki ........................... 382/284 |
| 2008/0309795 A1* | 12/2008 | Mitsuhashi et al. ..... 348/231.99 |

FOREIGN PATENT DOCUMENTS

| | | |
|---|---|---|
| EP | 1 538 536 A1 | 6/2005 |
| JP | 2001-326885 A | 11/2001 |
| JP | 2004-62739 A | 2/2004 |
| JP | 2004-506349 A | 2/2004 |
| JP | 2004-312430 A | 11/2004 |
| JP | 2004-343683 A | 12/2004 |
| JP | 2005-158015 A | 6/2005 |
| JP | 2005-184109 A | 7/2005 |
| JP | 2005-286654 A | 10/2005 |
| JP | 2006-60271 A | 3/2006 |
| JP | 2006-119925 A | 5/2006 |
| JP | 2006-157384 A | 6/2006 |
| JP | 2006-163966 A | 6/2006 |
| WO | WO-02/12990 A2 | 2/2002 |

* cited by examiner

IMAGE DISPLAY DEVICE, IMAGE DISPLAY METHOD, IMAGE DISPLAY SYSTEM, IMAGE DATA TRANSMITTING DEVICE, PROGRAM, AND STORAGE MEDIUM

This nonprovisional application claims priority under USC Section 119(a) of Patent Application No. 174542/2006 filed in Japan on Jun. 23, 2006, and claims the benefit under 35 USC Section 119(e) of U.S. Provisional Application No. 60/833,256 filed on Jul. 26, 2006, the entire contents of all of which are hereby incorporated by reference.

FIELD OF THE INVENTION

The present invention relates to an image display device, an image display method, an image display system, an image display program, and a computer-readable storage medium storing the image display program, all of which display in succession images included in an image group. Also, the present invention relates to an image data transmitting device which transmits image data to the image display device.

BACKGROUND OF THE INVENTION

With the widespread use of digital cameras, photographs have been frequently dealt with in the form of image data. With this trend, it has become common to enjoy photographs in the following two ways. The first one is the conventional way that people view developed photographs. The second one is the new way that people causes an image display device to display thereon photographs stored in the form of image data.

There area various kinds of display methods for displaying a plurality of photographs on an image display device. Among the methods, slideshow display and thumbnail list display are typical display methods in widespread use.

The slideshow display is a display method in which a plurality of photographs are displayed in succession while being changed at regular time intervals. Users can view the photographs displayed in succession with the passage of time as if they watch moving images. Meanwhile, the thumbnail list display is a display method in which thumbnails which are reduced images of a plurality of photographs are displayed at a time. The thumbnail list display is useful in selecting a desired image from among a plurality of images.

An image display device capable of displaying a plurality of photographs in slideshow format is, for example, a personal computer disclosed in Japanese Unexamined Patent Publication No. 326885/2001 (Tokukai 2001-326885; published on Jan. 22, 2001). The personal computer disclosed in the above-mentioned publication enhances convenience for a user by allowing the user to select photographs in thumbnail list display, thereafter performing slideshow display of the selected photographs and by returning to the thumbnail list display after the completion of the slideshow display.

Another image display device capable of performing slideshow display is a digital camera disclosed in Japanese Unexamined Patent Publication No. 184109/2005 (Tokukai 2005-184109; published on Jul. 7, 2005). The above-mentioned publication discloses the following technique: when the digital camera detects a deletion operation during slideshow display, the digital camera suspends the slideshow display, displays side by side on a monitor (a) an image displayed at a point in time when the deletion operation was detected and (b) an image displayed before the image (a), and detects a selection instruction, after which the digital camera returns to the slideshow display. This enhances convenience in deleting an image included in slideshow.

In addition, still another image display device is known. This image display device can display photographs which are stored in a server device located far from the image display device, through the use of a network such as the Internet. Example of such an image display device is disclosed in Japanese PCT National Phase Unexamined Patent Publication No. 506349/2004 (Tokuhyo 2004-506349; published on Feb. 26, 2004).

However, the image display device which performs slideshow display has the problem that a target image to be displayed cannot be displayed at a timing at which the target image is to be displayed. That is, the image display device has the problem that display delay can occur. The display delay causes the problem that the user keeps waiting until the target image to be displayed is displayed.

In the slideshow display, when the time comes to display a next image, the next image must be displayed immediately. Further, in response to a user's instruction to display an image (e.g. next or previous image) other than an image currently displayed during the slideshow display, it is preferable to display the image immediately. Thus, the slideshow display requires display of a target image to be displayed at a proper timing.

However, image data with a high volume of image information, such as photograph, is generally the one obtained by compressing original image information. That is, the image data must be expanded or decoded to display an image included in the image data. For this reason, when the processing is started after the time comes to display a target, there occurs display delay of at least the amount of time required for expansion of the image data.

The problem of display delay becomes more serious in an image display device which acquires image data to be displayed in slideshow from a server device far away from the image display device through a network to display the acquired image data. This is because there occurs display delay of not only the amount of time required for expansion of the image data but also the amount of time required for acquisition of the image data.

Considered as measures that can be taken to prevent the above-mentioned display delay are acquiring in advance image data to be displayed in slideshow display or expanding in advance image data to be displayed in slideshow display. However, in order to perform such processes, it is necessary to provide the image display device with a storage device for storing acquired image data and expanded image data. The larger data size of image data, and the larger the number of sets of image data included in slideshow, the higher a required storage capacity is. Therefore, in order to acquire in advance image data to be displayed in slideshow or to expand in advance image data to be displayed in slideshow, a high-capacity storage device needs to be provided. As a result, cost increase is inevitable.

SUMMARY OF THE INVENTION

The present invention has been attained in view of the above problem, and an object of the present invention is to provide an image display device, an image display method, an image display system, an image display program, and a computer-readable storage medium storing the image display program therein, all of which avoid a user from being subject to stress when there occurs display delay in slideshow display.

In addition, an object of the present invention is to provide an image data transmitting device, an image data transmission program, and a computer-readable storage medium storing the image data transmission program therein, all of which transmit image data to such an image display device.

In order to solve the above problem, an image display device of the present invention is an image display device which displays images in succession on a display section while changing the images, the images being included in an image group, the image display device including: display control means causing the display section to display thereon a list of all or part of reduced images of a reduced image group, which reduced images correspond to the respective images of the image group, when a display timing at which a target image other than a currently displayed image of the image group is to be displayed comes before a given point in time.

Further, in order to solve the above problem, an image display method of the present invention is an image display method of displaying images in succession on a display section while changing the images, the images being included in an image group, the image display method including: a reduced image list display step of causing the display section to display thereon a list of all or part of reduced images of a reduced image group, which reduced images correspond to the respective images of the image group, when a display timing at which a target image other than a currently displayed image of the image group is to be displayed comes before a given point in time.

According to the above arrangement, when a display timing at which a target image other than a currently displayed image of the image group is to be displayed comes before a given point in time, the image display device can cause the display section to display thereon a list of all or part of the reduced images, instead of displaying the target image to be displayed at the display timing. Thus, when the target image to be displayed at the display timing is not ready to be displayed, the image display device does not make the user wait without doing anything. Therefore, according to the above arrangement, it is possible to reduce stress to which the user is subject when the target image to be displayed at the display timing cannot be displayed.

In addition, according to the above arrangement, it is possible to present to the user especially the reduced image group corresponding to the image group, instead of the target image to be displayed. For example, display of the reduced image group in list view can be used to cause the user to select a desired image from among the image group.

Note that the target image is, for example, a next image to be displayed next to a currently displayed image in a display order which is set for the image group. In a case where the user is allowed to designate which image should be displayed, the image designated to display by the user is included in examples of the target image. The target image designated by user's instruction may be the above-mentioned next image or may be a previous image that was displayed previous to a currently displayed image. Further, the target image designated by user's instruction may be other image included in the image group.

The display timing is, for example, a point in time when an image next to a currently displayed image should be displayed, or a point in time when user's instruction to display an image other than a currently displayed image is accepted. Here, the point in time when an image next to a currently displayed image should be displayed can be determined to be, for example, a point in time when a timer which was activated when display of the currently displayed image was started recognizes a lapse of a predetermined image display time.

The given point in time may be, for example, a point in time determined regardless of the state of the image display device, such as a point in time when a predetermined time has elapsed since display of the currently displayed image was started. Alternatively, the given point in time may be a point in time determined on the basis of the state of the image display device, such as a point in time when an image to be displayed next to the currently displayed image is ready to be displayed.

The reduced image corresponding to each of the images included in the image group is, for example, an image obtained by reducing each of the images included in the image group.

The display section may be installed in the image display device or may be separated from the image display device. For example, (a) a television receiver in which a liquid crystal display panel is installed as the display section and (b) a desktop computer with an external display as the display section are included in the technical scope of the present invention.

The image display device of the present invention is an image display device which displays images in succession on a display section while changing the images, the images being included in an image group, the image display device including: instruction accepting means accepting an instruction given by a user; and display control means causing the display section to display thereon a list of all or part of reduced images of a reduced image group, which reduced images correspond to the respective images of the image group, when the instruction accepting means accepts an instruction given by a user a given number of times within a predetermined time period.

The user who views the images displayed in succession on the image display device often positively performs the operation for entering an instruction to the image display device, when the user wants to check the plurality of images in a short time to find a desired image. According to the above arrangement, the image display device displays the reduced image group corresponding to the image group in list view on the display section, when the user enters the instruction to the image display device. This allows the user to immediately find a desired image. That is, the above arrangement brings about the effect of allowing the above-mentioned user to find a desired image without being subject to stress.

Note that the user's instruction accepted by the instruction accepting means are, for example, a next image display instruction that instructs to display a next image to be displayed next to a currently displayed image and a previous image display instruction that instructs to display a previous image displayed previous to the currently displayed image.

The image display device of the present invention is an image display device which displays images in succession on a display section while changing the images, the images being included in an image group, the image display device including: display control means causing the display section to display thereon a list of all or part of reduced images of a reduced image group, which reduced images correspond to the respective images of the image group, in a non-target-image-display-ready state where a target image to be displayed in the image group is not ready to be displayed on the display section.

According to the above arrangement, instead of the target image, all or part of the reduced image group is displayed in list view in the non-target-image-display-ready state where the target image is not ready to be displayed on the display section. This solves the problem that the user is kept waiting until the target image gets ready to be displayed even in the non-target-image-display-ready state. Therefore, the above arrangement brings about the effect of reducing stress to which the user is subject when the display delay occurs.

In addition, according to the above arrangement brings about the effect of presenting to the user the reduced image group corresponding to the image group displayed in list view in the non-target-image-display-ready state. For example, display of the reduced image group in list view can be used to cause the user to select a desired image from among the image group.

Note that the target image is, for example, a next image to be displayed next to a currently displayed image among a plurality of images displayed in succession. In a case where the user is allowed to designate which image should be displayed, the image designated to display by the user is included in examples of the target image.

The non-target-image-display-ready state is, for example, a state in which the target image exists outside the image display device and acquisition of the target image is not completed, or a state in which the target image is compressed and expansion of the target image is not completed. Also the non-target-image-display-ready state includes a state in which the target image does not exist inside the image display device because the target image was deleted for the purpose of saving a storage space of a storage device or other purpose after acquisition of the target image was completed.

An image data transmitting device of the present invention includes: image data transmitting means transmitting to the image display device image data of the target image and image data of the reduced images to be displayed in list view.

The image data transmitting device transmits to the image display device image data of the target image and image data of the reduced images to be displayed in list view. Therefore, the image display device can acquire from the image data transmitting device image data of the target image and image data of the reduced images to be displayed in list view in a case where the image display device does not hold therein in advance image data of the target image and image data of the reduced images to be displayed in list view.

According to the above arrangement, even when the image display device does not hold therein in advance image data of the target image and image data of the reduced images to be displayed in list view, the effects are brought about that the image display device can display the target image and that the image display device can display the reduced images in list view, instead of the target image.

An image display system of the present invention includes: the above-mentioned image display device; and an image data transmitting device transmitting to the image display device image data of the target image and image data of the reduced images to be displayed in list view.

The image data transmitting device transmits to the image display device image data of the target image and image data of the reduced images to be displayed in list view. Therefore, the image display device can acquire from the image data transmitting device image data of the target image and image data of the reduced images to be displayed in list view in a case where the image display device does not hold therein in advance image data of the target image and image data of the reduced images to be displayed in list view.

According to the above arrangement, even when the image display device does not hold therein in advance image data of the target image and image data of the reduced images to be displayed in list view, the image display system can be realized such that the image display device can display the target image and that the image display device can display the reduced images in list view, instead of the target image.

Note that the image display device may be realized by a computer. In such a case, the scope of the present invention includes an image display program which causes a computer to realize the image display device by causing the computer to operate as the foregoing means, and a computer-readable storage medium storing the image display program therein.

The image data transmitting device may be realized by a computer. In such a case, the scope of the present invention includes an image data transmission program which causes a computer to realize the image data transmitting device by causing the computer to operate as the foregoing means, and a computer-readable storage medium storing the image data transmission program therein.

Additional objects, features, and strengths of the present invention will be made clear by the description below. Further, the advantages of the present invention will be evident from the following explanation in reference to the drawings.

DETAILED DESCRIPTION OF THE INVENTION

The following will describe one embodiment of the present invention with reference to FIGS. 1 through 18.

(Slideshow Display System 1)

Figure 2:
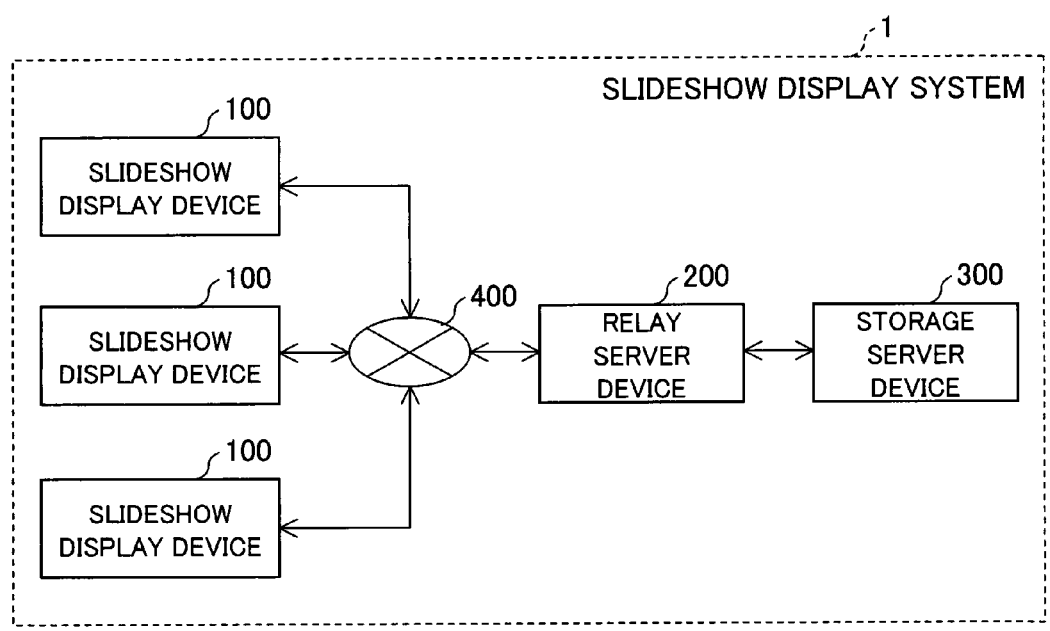
FIG. 2 is an illustration of the embodiment of the present invention and a schematic block diagram illustrating schematically the structure of a slide display system.

First of all, a slideshow display system (image display system) 1 according to the present embodiment will be described with reference to FIG. 2. FIG. 2 is a schematic block diagram illustrating schematically the structure of a slideshow display system. As illustrated in FIG. 2, the slideshow display system 1 includes a slideshow display device (image display device) 100, a relay server device (image data transmitting device) 200, and a storage server device 300.

The slideshow display device 100 in FIG. 2 is a terminal device which performs slideshow display. Performing slideshow display is to display images in succession while changing the images. The images are contained in an image group consisting of a plurality of images. As illustrated in FIG. 2, the slideshow display system 1 can include a plurality of slideshow display devices 100. Each of the slideshow display devices 100 can be realized, for example, with the use of a television receiver installed in a user's home, as will be described later.

As illustrated in FIG. 2, the slideshow display device 100 is connected to the relay server device 200 via a network 400 such as Internet. The slideshow display device 100 is arranged so as to be able to communicate with the relay server device 200. The relay server device 200 supplies various data required for slideshow display to the slideshow display device 100 via the network 400.

The storage server device 300 in FIG. 2 is a device for storing image data to be transmitted from the relay server device 200 to the slideshow display device 100. The relay server device 200 and the storage server device 300 are installed in a business office of a business owner who operates the slideshow display system 1, for example. Note that although the relay server device 200 and the storage server device 300 are separate devices in FIG. 2, they can be integrated into a single device.

The relay server device 200 manages image data stored in the storage server device 300 by "Album" (image group). Each album, which is a collective entity of a plurality of sets of image data, is assigned album attributes such as an album ID, an album title, a creation date of the album, a person who creates the album, the number of images included in the album.

In order to designate a desired album, the slideshow display device 100 transmits an album ID of the desired album to the relay server device 200. The relay server device 200 transmits album information of the album designated by the album ID to the slideshow display device 100.

The album information includes (a) an image data group of thumbnails (reduced images) corresponding to respective images included in the album and (b) a thumbnail list view screen creation script. The thumbnail list view screen creation script stores layout definition information which specifies layout of a thumbnail list view screen. The thumbnail list view screen creation script can be rendered as text data described in XML (Extensible Markup Language). In this case, the layout definition information can be described in SVG (Scalable Vector Graphics), for example. The slideshow display device 100 is arranged so as to create a thumbnail list view screen using the image data group of thumbnails, in accordance with layout definition information included in the obtained thumbnail list view screen creation script.

Note that the image data group and the thumbnail list view screen creation script, which are included in the album information, may be supplied in the form of mutually independent data to the slideshow display device 100. Alternatively, the image data group and the thumbnail list view screen creation script may be supplied in the form of an integrated template including them to the slideshow display device 100.

The slideshow display device 100 determines one of the images included in the album as a target image, and transmits a data acquisition request for acquiring image data of the target image to the relay server device 200. In response to the data acquisition request, the relay server device 200 transmits the image data of the target image to slideshow display device 100.

Note that the relay server device 200 may be arranged so as to transmit an image display screen creation script that stores layout definition information as well as the image data of the target image to the slideshow display device 100. The layout definition information specifies layout of a display screen for displaying the target image. The image display screen creation script can be rendered as text data described in XML. In this case, the layout definition information included in the image display screen creation script can be described in SVG (Scalable Vector Graphics), for example. In supplying the image data and the image display screen creation script to the slideshow display device 100, the image data of the target image and the image display screen creation script may be supplied in the form of mutually independent data to the slideshow display device 100. Alternatively, the image data of the target image and the image display screen creation script may be supplied in the form of an integrated template including them to the slideshow display device 100.

The slideshow display device 100 displays the acquired target image for a predetermined time. The slideshow display device 100 determines an image to be displayed next to the currently displayed image as a new target image, and acquires the new target image from the relay server device 200. When the predetermined time lapses after the start of display of the currently displayed image, the slideshow display device 100 displays the new target image instead of the currently displayed image. By repeating the above operation, the slideshow display device 100 displays a plurality of images included in the album in slideshow.

As described above, the slideshow display device 100 can perform slideshow display of images included in an album which is managed under the relay server device 200 at a distant location. If display delay occurs during the slideshow display, the slideshow display device 100 can perform thumbnail list display in accordance with album information acquired from the relay server device 200.

Note that either or both the slideshow display device 100 and the storage server device 300 may serve as the function of the relay server device 200 to establish an image display system constituted by the slideshow display device 100 and the storage server device 300.

(Slideshow Display Device 100)

Figure 3:
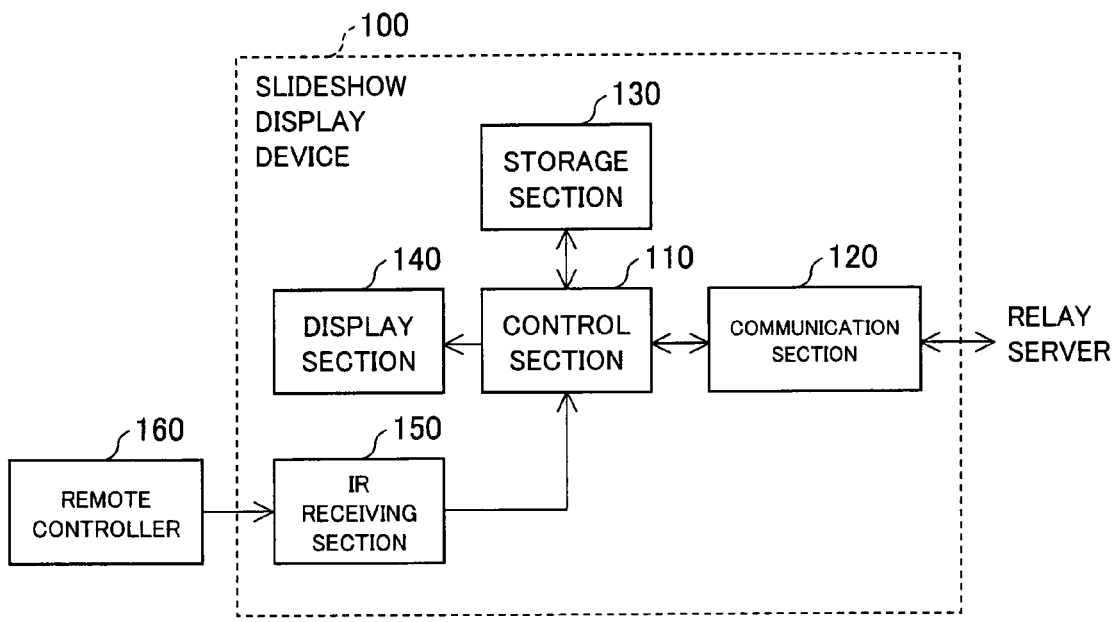
FIG. 3 is an illustration of the embodiment of the present invention and a functional block diagram illustrating a primary structure of the slideshow display device.
Figure 4:
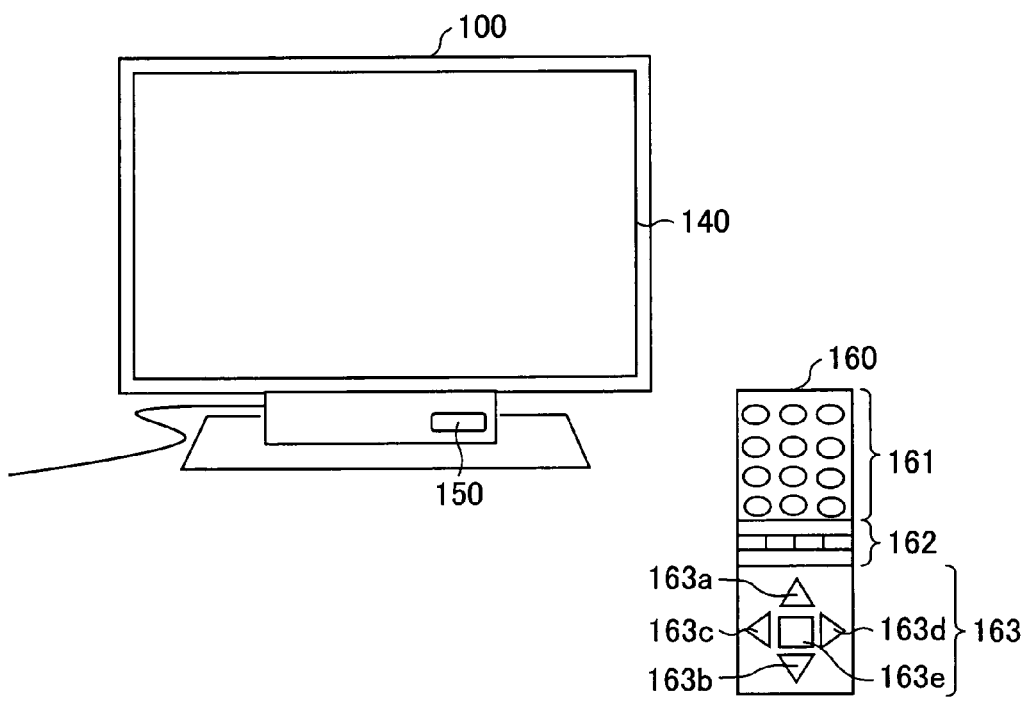
FIG. 4 is an illustration of the embodiment of the present invention and an external view illustrating an outward appearance of the slideshow display device.

Next, the following will describe a general structure of the slideshow display device 100 with reference to FIGS. 3 and 4. FIG. 3 is a functional block diagram illustrating a primary structure of the slideshow display device 100. FIG. 4 is an external view illustrating an outward appearance of the slideshow display device 100.

As illustrated in FIG. 3, the slideshow display device 100 includes a control section 110, a communication section 120, a storage section 130, a display section 140, and an IR receiving section 150. The slideshow display device 100 operates in response to the instructions entered into the remote controller 160 by a user.

The communication section 120 is a communication interface through which transmission and reception of various kinds of data with the relay server device 200 are performed. The control section 110 can exchange data with the relay server device 200 through the communication section 120.

The storage section 130 is a storage device such as memory. The control section 110 causes the storage section 130 to store data acquired from the relay server device 200 through the communications section 120. The storage section 130 stores in advance various kinds of data for common use in slideshow display. The control section 110 can read the data at a given point in time to use them.

The IR receiving section 150 is a communication interface through which infrared data communications with the remote controller 160 are performed. The remote controller 160 transmits operation information indicative of what operation has been accepted from the user, to the IR transmitting section 150 on an infrared carrier wave. The control section 110 performs various kinds of information processing in accordance with the operation information acquired through the IR receiving section 150. Main information processing performed by the control section 110 is to generate various kinds of display screens on the basis of data acquired through the communication section 120 and data stored in the storage section 130, and to present the display screens on the display section 140. The function of the control section 110 will be described in detail later.

As illustrated in FIG. 4, the slideshow display device 100 can be realized with the use of a television receiver, for example. If the slideshow display device 100 is realized with the use of a television receiver, a display panel included in the television receiver can be used as the display section 140 for powerful slideshow display.

FIG. 4 also illustrates an example of the structure of the remote controller 160. In FIG. 4, the remote controller 160 includes a numeric button section 161, a command button section 162, and a cross button section 163.

As illustrated in FIG. 4, the numeric button section 161 includes numeric buttons corresponding to at least 0 to 9. The user enters any digit numbers by pressing the buttons as required. The command button section 162 includes command buttons such as a "menu" button and "return" button. According to the progress of the processing in the slideshow display device 100, the command buttons are associated with commands selectable at that time. By pressing any of the command buttons, the user enters a command associated with the pressed button among the commands selectable at that time. For example, the menu button is associated with a command for displaying menu dialogs. The return button is associated with a command for hiding menu dialogs. The cross button section 163 includes four buttons (upward button 163a, downward button 163b, left button 163c, and right button 163d) respectively corresponding to upward, downward, left, and right directions and an enter button 163e, which is surrounded by the four buttons. By pressing the buttons 163a through 163d, the user points at a desired object among objects displayed on the display section 140. By pressing the enter button 163e, the user selects an object at which the user currently points. For example, the user selects a desired image from among thumbnails displayed in list view and selects a desired menu from among the menu dialogs which are displayed with the press of the menu button. The buttons 163a through 163e included in the cross button section 163 can be associated with functions other than the functions of pointing at and selecting an object, according to the progress of the processing in the slideshow display device 100. For example, during the slideshow display, the right button 163d is associated with a command for displaying an image next to the currently displayed image. The left button 163c is associated with a command for displaying an image previous to the currently displayed image. The enter button 163e corresponds to a command for starting a slideshow display application, a command for suspending a slideshow, or a command for resuming a slide show.

(Control Section 110 of the Slideshow Display Device 100)

The slideshow display device 100 is distinguished by the control section 110 which causes the display section 140 to display various display screens. The following will describe the control section 110 in detail with reference to FIG. 1 and FIGS. 5 through 11.

Figure 1:
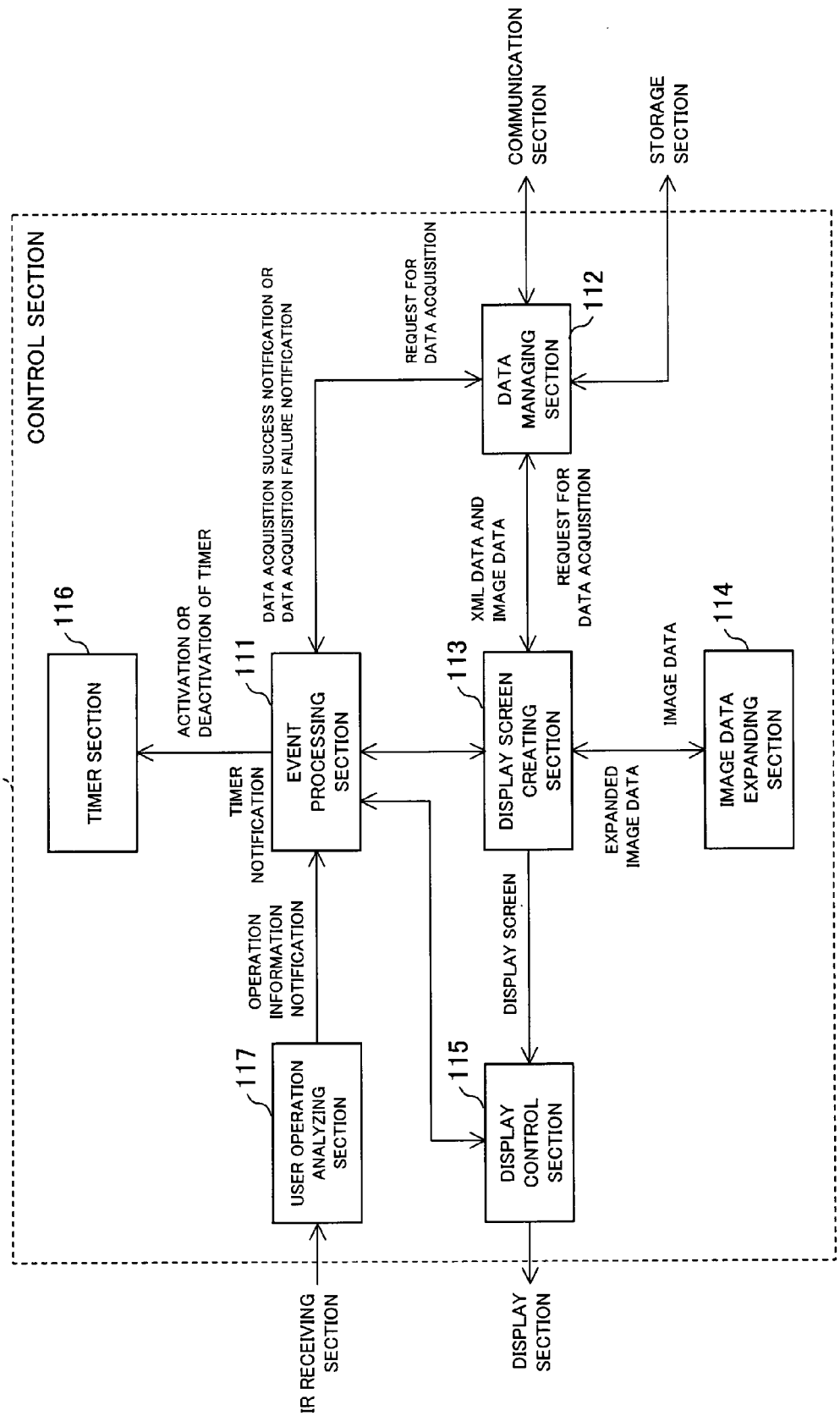
FIG. 1 is an illustration of the embodiment of the present invention and a functional block diagram illustrating the structure of a control section included in a slideshow display device.

FIG. 1 is a functional block diagram illustrating the structure of the control section 110 included in the slideshow display device 100. As illustrated in FIG. 1, the control section 110 includes an event processing section 111, a data managing section (reduced image acquiring means, target image acquiring means) 112, a display screen creating section (list view screen creating means) 113, an image data expanding section (target image data expanding means) 114, a display control section (display control means) 115, a timer section 116, and a user operation analyzing section (target image display instruction accepting means, instruction accepting means) 117.

The data managing section 112 is a block for acquiring various kinds of data from the relay server device 200. The data acquired by the data managing section 112 include: image data of a target image to be displayed in slideshow display; and image data of a thumbnail to be displayed in thumbnail list display. In response to the instruction from the event processing section 111, the data managing section 112 transmits a data acquisition request for acquiring required data to the relay server device 200 through the communication section 120. If succeeding in acquiring the data, the data managing section 112 notifies the event processing section 111 of a data acquisition success notification. If failing in acquiring the data, the data managing section 112 notifies the event processing section 111 of a data acquisition failure notification. The data managing section 112 causes the storage section 130 to store various data acquired.

The display screen creating section 113 is a block for creating various kinds of display screens which are displayed on the display section 140. The display screens created by the display screen creating section 113 include: a display screen on which a target image is displayed in slideshow display; and a display screen on which thumbnails are displayed in list view during thumbnail display. The display screen creating section 113 obtains various kinds of data required for creation of a display screen from the data managing section 112. The data managing section 112 reads various kinds of data for which the display screen creating section 113 has requested from the storage section 130, and transmits the read data to the display screen creating section 113. The display screen creating section 113 creates various kinds of display screens on the basis of the data obtained from the data managing section 112, and transmits the created display screens to the display control section 115. The display control section 115 is a block for causing the display section 140 to display various kinds of display screens thereon. In response to instructions from the event processing section 111, the display control section 115 controls the display section 140 to display thereon the display screens created by the display screen creating section 113.

The image data expanding section 114 is a block for immediately expanding image data of a target image to be displayed to its displayable form. Expansion performed by the image data expanding section 114 is required, for example, in a case where image data of a target image is compressed or encoded image data.

The timer section 116 transmits a timer notification to the event processing section 111 when a predetermined time lapses after the timer section 116 is started. When the user operation analyzing section 117 detects the occurrence of user's operation through the IR receiving section 150, the user operation analyzing section 117 transmits an operation information notification to the event processing section 111. The operation information notification indicates the contents of the user's operation.

The event processing section 111 manages an operation execution timing of the control section 110 in accordance with the foregoing various kinds of notifications, which are notified by the data managing section 112, the timer section 116, and the user operation analyzing section 117.

More specifically, the event processing section 111 determines a process to be performed and a transition destination from the contents of a received notification and a current state, on the basis of a predetermined state transition table. Here, the process to be performed includes: a pre-transition process to be performed before state transition; and a post-transition process to be performed after state transition. That is, upon receipt of various kinds of notifications, the event processing section 111 (1) controls the sections included in the control section 110 so that a defined pre-transition process is executed, (2) causes transition from a current state to a defined state, and (3) controls the sections included in the control section 110 so that a defined post-transition process is executed.

Figure 5:
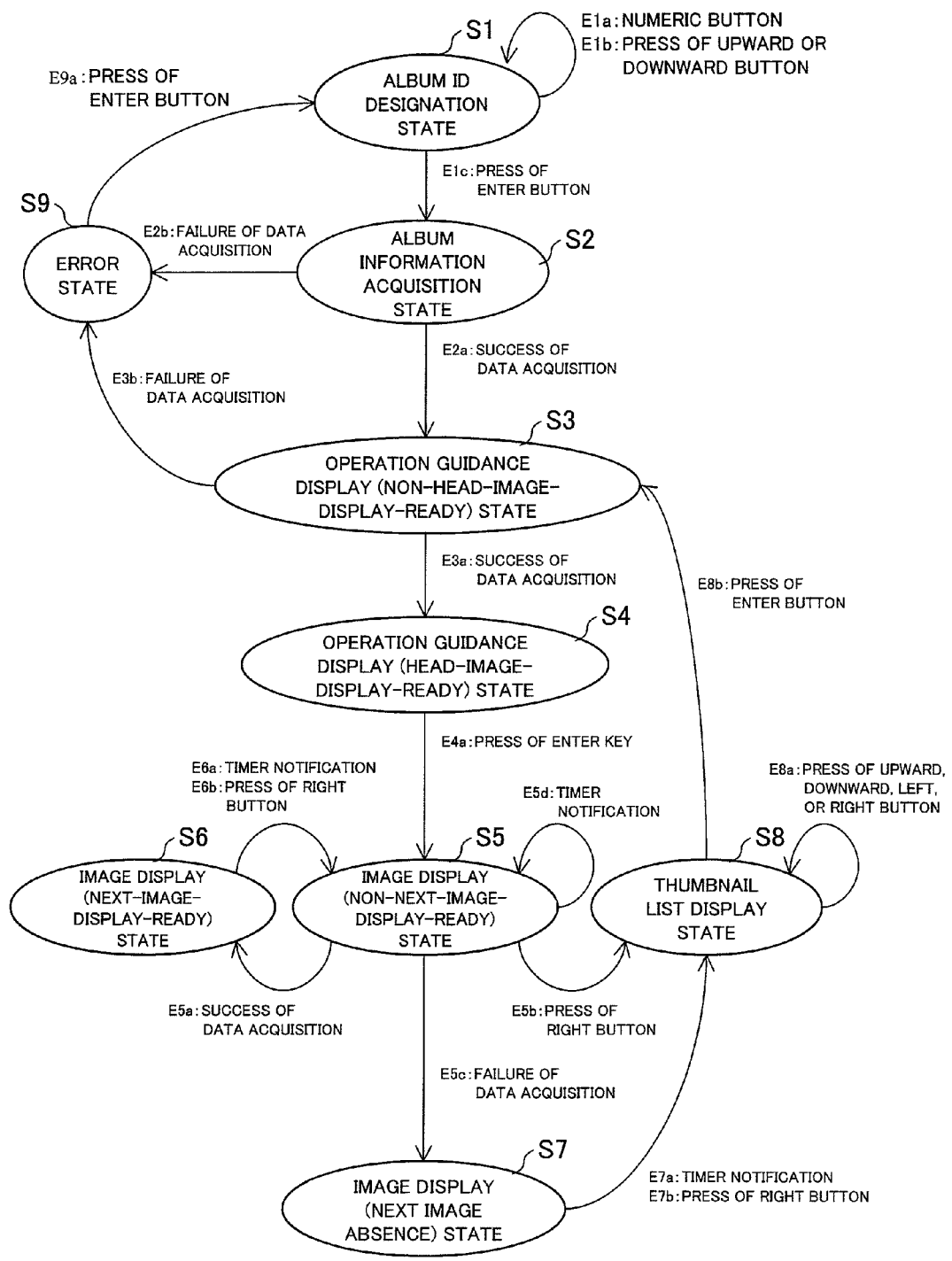
FIG. 5 is an illustration of the embodiment of the present invention and a state transition diagram defining the operations of the control section in the slideshow display device.

FIG. 5 is a state transition diagram defining the operations of the event processing section 111. As illustrated in FIG. 5, as states that can be taken by the event processing section 111, the following nine states are defined in advance: an album ID designation state S1; an album information acquisition state S2; an operation guidance display (non-head-image-display-ready) state S3; an operation guidance display (head-image-display-ready) state S4; an image display (non-next-image-display-ready) state S5; an image display (next-image-display-ready) state S6; an image display (next image absence) state S7; a thumbnail list display state S8; and an error state S9. The event processing section 111 takes any one of the nine states at each point in time.

(Flow of the Operations in the Control Section 110)

The flow of the operations in the control section 110 will be described below with reference to FIG. 5 since the flow is defined by the state transition diagram illustrated in FIG. 5.

Album ID Designation State S1

The album ID designation state S1 is a state causing a user to designate an album ID. In the album ID designation state S1, the display control section 115 causes the display section 140 to display thereon a display screen 600 or a display screen 600' illustrated in FIG. 6, for example. For example, the display screen 600 and the display screen 600' can be created by the display screen creating section 113 in accordance with a script stored in advance in the storage section 130 and described in SVG.

Figure 6A:
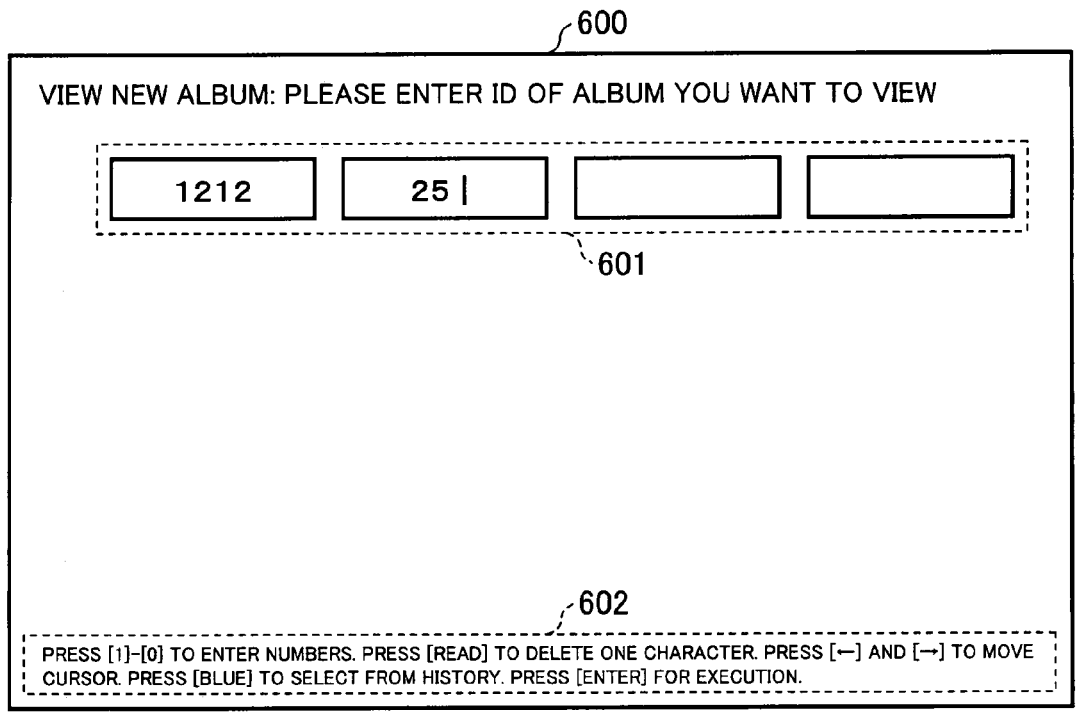
FIG. 6(a) is an illustration of the embodiment of the present invention and a display screen block diagram illustrating an example of the structure of a display screen shown on a display section in an album ID designation state.

The display screen 600 illustrated in FIG. 6(a) is a display screen that urges a user to enter an album ID of an album that the user wants. The display screen 600 includes an album ID display area 601 where an album ID entered by a user is displayed, and an available command display area 602 where commands that the user can enter are displayed in list view. The user can enter an album ID by pressing the numeric button section 161 of the remote controller 160 while seeing numbers entered by the user and displayed on the album ID display area 601. Further, the user can enter a command displayed in the available command display area 602 by pressing an appropriate button of the remote controller 160. For example, at the press of the enter button 163e, a user can designate a number displayed at that time in the album ID display area 601, as an album ID of an album that the user wants.

Figure 6B:
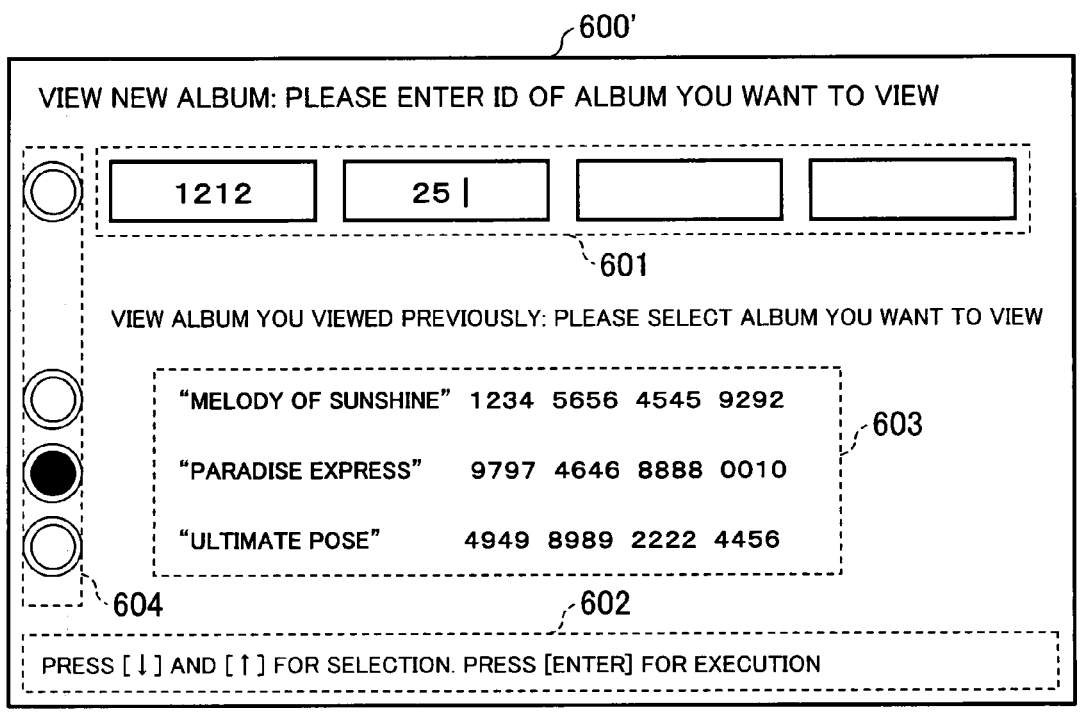
FIG. 6(b) is an illustration of the embodiment of the present invention and a display screen block diagram illustrating another example of the structure of the display screen shown on the display section in the album ID designation state.

The display screen 600' illustrated in FIG. 6(b) includes not only the album ID display area 601 and the available command display area 602, but also a viewed album list 603 and an indicator group 604. The viewed album list 603 is a list of album titles of albums that the user viewed in the past. The indicator group 604 is a group of indicators respectively corresponding to the album titles listed in the viewed album list 603. In a situation where it is about to accept an album ID entered by pressing the numeric button section 161, an indicator corresponding to the album ID display area 601 is highlighted. In a situation where any of the album titles of the viewed album list 603 is selected, an indicator corresponding the selected album title is highlighted. The user can select a desired album title from among the album titles listed in the viewed album list 603 by pressing the upward button 163a and the downward button 163b, instead of entering a new album ID in the album ID display area 601. By pressing the enter button 163e after selecting a desired album title, the user can designate as a desired album ID an album ID of the album title selected at that time.

The event processing section 111 waits for an event notification in a state where the above-mentioned display screen is displayed. Events to which the event processing section 111 responses in the album ID designation state S1 are an event E1a that is a press of the numeric button section 161, an event E1b that is a press of the upward button 163a or the downward button 163b, and an event E1c that is a press of the enter button 163e.

Upon detecting the press of the numeric button section 161 of the remote controller 160, the user operation analyzing section 117 transmits to the event processing section 111 an operation information notification that is a notification of the occurrence of the event E1a. Upon receipt of the operation information notification, the event processing section 111 updates an album ID in accordance with the pressed number. The event processing section 111 instructs the display control section 115 to update a display screen. Upon receipt of the instruction, the display control section 115 controls the display section 140 to display an updated album ID in the album ID display area 601.

Upon detecting the press of the upward button 163a or the downward button 163b of the remote controller 160, the user operation analyzing section 117 transmits to the event processing section 111 an operation information notification that is a notification of the occurrence of the event E1b. The operation information notification includes information indicative of which button of the upward button or the downward button has been pressed. Upon receipt of the operation information notification, the event processing section 111 updates an album selection state information according to the type of the pressed button. The album selection state information indicates which album is selected among the albums listed in the viewed album list 603. Further, the event processing section 111 instructs the display control section 115 to update a display screen. Upon receipt of the instruction, the display control section 115 refreshes the radio button group 604 so that a radio button corresponding to a currently selected album is highlighted in accordance with the album selection state information.

Upon detecting the press of the enter button 163e of the remote controller 160, the user operation analyzing section 117 transmits to the event processing section 111 an operation information notification that is a notification of the occurrence of the event E1c. Upon receipt of the operation information notification, the event processing section 111 causes transition from the album ID designation state S1 to the album information acquisition state S2. Thereafter, the event processing section 111 instructs the data managing section 112 to acquire album information of an album having an album ID designated by the user. In a case where the user selects an album from among the albums listed in the viewed album list 603, the data managing section 112 determines the user-designated album ID in accordance with the above-mentioned album selection state information. The data managing section 112 transmits to the relay server device 200 an album information acquisition request for acquiring album information. The album information acquisition request includes at least a user-designated album ID as information. In response to the album information acquisition request, the relay server device 200 transmits album information of the user-designated album to the data managing section 112.

Album Information Acquisition State S2

The album information acquisition state S2 is a state waiting for a response of the relay server device 200 to the previously transmitted album information acquisition request. In the album information acquisition state S2, the display control section 115 causes a display screen 700 illustrated in FIG. 7, for example, to be displayed on the display section 140. The display screen 700 can be created by the display screen creating section 113 in accordance with a script stored in advance in the storage section 130 and described in SVG.

Figure 7:
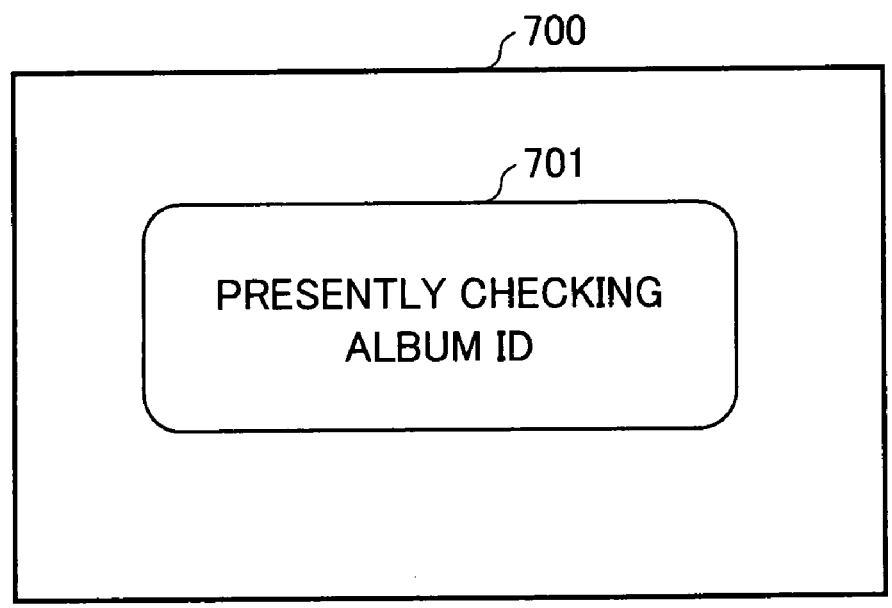
FIG. 7 is an illustration of the embodiment of the present invention and a display screen block diagram illustrating an example of the structure of the display screen shown on the display section in an album information acquisition state.

The display screen 700 illustrated in FIG. 7 is a display screen to inform to a user that the process for acquiring album information is in progress. The display screen 700 includes an appropriate character string 701 such as "PRESENTLY CHECKING ALBUM ID".

In the album information acquisition state S2, the event processing section 111 waits for the event E2a that the data managing section 112 has succeeded in acquiring album information or the event E2b that the data managing section 112 has failed in acquiring album information.

Upon completion of acquisition of album information transmitted from the relay server device 200 as a response to the album information acquisition request, the data managing section 112 transmits to the event processing section 111 data acquisition success notification that is a notification of the occurrence of the event E2a. Upon receipt of the data acquisition success notification, the event processing section 111 causes transition to the operation guidance display (non-head-image-display-ready) state S3.

After the transition to the operation guidance display (non-head-image-display-ready) state S3, the event processing section 111 instructs the data managing section 112 to acquire a head image of the user-designated album. The data managing section 112 transmits to the relay server device 200 a head image acquisition request. The head image acquisition request is a request for acquiring data for displaying a head image of an album.

Note that the head image of the album may be an image such as a photograph, or may be an image composed of only character information including an album title and/or a creator's name. In a case where the head image is composed of character information only, the data for displaying the head image may be a head image display screen creation script described in SVG which script includes (i) character information of the head image and (ii) layout definition information that defines layout of the character information. Further, in a case where the head image is an image such as a photograph, the data for displaying the head image may be image data of the head image or may be both the image data of the head image and a head image display screen creation script which includes layout definition information that defines layout of a display screen for display of the head image.

Further, the event processing section 111 instructs the display screen creating section 113 to create a thumbnail list view screen. The display screen creating section 113 creates the thumbnail list view screen to display a list of thumbnails of a thumbnail image data group on the display section 140, in accordance with a thumbnail list view screen creation script included in the acquired album information. The thus created thumbnail list view screen is drawn off-screen in an image buffer so as to be displayed on the display section 140 at the time of transition to the thumbnail list display state S8. The thumbnail list display state S8 will be described later.

In a case where there is no response from the relay server device 200 within a predetermined time period after the transmission of the album information acquisition request, the data managing section 112 transmits to the event processing section 111a data acquisition failure notification that is a notification of the occurrence of the event E2b. Further, the data managing section 112 also transmits the data acquisition failure notification to the event processing section 111 in a case where the data managing section 112 receives from the relay server device 200 error information as a response to the album information acquisition request. Examples of a situation that requires the relay server device 200 to transmit error information includes a situation in which an album of the user-designated album ID is not under the management of the relay server device 200. Upon receipt of any of the data acquisition failure notifications, the event processing section 111 causes transition to the error state S9. The error state S9 will be described later.

Operation Guidance Display (Non-Head-Image-Display-Ready) State S3

The operation guidance display (non-head-image-display-ready) state S3 is a state waiting for a response of the relay server device 200 to the head image acquisition request (in the case of transition from S2 to S3), or waiting for a response of the relay server device 200 to the selected image acquisition request (in the case of transition from S8 to S3), while displaying an operation guidance. In the operation guidance display (non-head-image-display-ready) state S3, the display control section 115 causes the display section 140 to display a display screen 800a illustrated in FIG. 8(a), for example, thereon. For example, the display screen 800 can be created by the display screen creating section 113 in accordance with a script stored in advance in the storage section 130 and described in SVG.

A display screen 800a is a display screen for showing operation guidance. The display screen 800a includes an operation guidance character string 801 representing operation guidance. Thus, the display of the display screen 800a representing operation guidance before the start of a slideshow can avoid a user from being subject to stress when it takes much time to acquire a head image or a selected image.

In the operation guidance display (non-head-image-display-ready) state S3, the event processing section 111 waits for an event E3a that the data managing section 112 has succeeded in acquiring a head image or an event E3b that the data managing section 112 has failed in acquiring a head image.

Upon completion of acquisition of image data of a head image (selected image) transmitted from the relay server device 200 as a response to the head image (selected image) acquisition request, the data managing section 112 transmits to the event processing section 111 data acquisition success notification that is a notification of the occurrence of the event E3a. Upon receipt of the data acquisition success notification, the event processing section 111 instructs the display screen creating section 113 to create a display screen for displaying an acquired head image (selected image) on the display section 140.

In response to the instruction, the display screen creating section 113 creates a display screen for displaying the head image (selected image) on the display section 140, and draws the created display screen off-screen. In a case where the script for image display is used to display a head image, the display screen creating section 113 creates a display screen in accordance with layout definition information of the script, and draws the created display screen off-screen. Further, in a case where the acquired head image (selected image) is in the form of compressed image data, the display screen creating section 113 instructs the image data expanding section 114 to expand the compressed image data. In response to the instruction, the image data expanding section 114 immediately expands the acquired image data into a displayable form. After the display screen creating section 113 draws the display screen off-screen, the event processing section 111 causes transition to the operation guidance display (head-image-display-ready) state S4.

After the transition to the operation guidance display (head-image-display-ready) state S4, the event processing section 111 instructs the display control section 115 to update the currently shown display screen 800a so as to present to a user that the head image (selected image) is ready to be displayed. In response to the instruction, the display control section 115 updates the display screen 800a illustrated in FIG. 8(a) to a display screen 800b illustrated in FIG. 8(b), for example. The display screen 800b includes not only the operation guidance character string 801, but also an available command display area 802 that urges a user who has finished checking the operation guidance to press the enter button 163e. The above-mentioned process for presenting to the user that the head image (selected image) is ready to be displayed is a process for providing a better operating comfort for the user, and thus can be omitted.

In a case where there is no response from the relay server device 200 within a predetermined time period after the transmission of the head image (selected image) acquisition request, the data managing section 112 transmits to the event processing section 111 a data acquisition failure notification that is a notification of the occurrence of the event E3b. The data managing section 112 also transmits the data acquisition failure notification that is a notification of the occurrence of the event E3b to the event processing section 111 in a case where there is something wrong with data acquired as a response to the head image (selected image) acquisition request. Upon receipt of any of the data acquisition failure notifications, the event processing section 111 causes transition to the error state S9. The error state S9 will be described later.

Operation Guidance Display (Head-Image-Display-Ready) State S4

The operation guidance display (head-image-display-ready) state S4 is a state waiting for user's press of the enter button 163e after the acquisition of a head image (selected image) is completed. In the operation guidance display (head-image-display-ready) state S4, the above-mentioned display screen 800b is displayed on the display section 140.

In the operation guidance display (head-image-display-ready) state S4, the event processing section 111 waits for operation information notification that is a notification of the occurrence of an event E4a. The event E4a is an event that the enter button 163e has been pressed.

Upon detection of the press of the enter button 163e of the remote controller 160, the user operation analyzing section 117 transmits to the event processing section 111 the operation information notification that is a notification of the occurrence of the event E4a. Upon receipt of the operation information notification, the event processing section 111 causes transition to the image display (non-next-image-display-ready) state S5.

After the transition to the image display (non-next-image-display-ready) state S5, the event processing section 111 instructs the display control section 115 to display the head image (selected image) on the display section 140. The display control section 115 shows on the display section 140 a display screen for displaying the head image (selected image) that has been already drawn off-screen. Then, the event processing section 111 instructs the data managing section 112 to acquire a next image to be displayed next. The data managing section 112 transmits to the relay server device 200 a next image acquisition request for acquiring a next image. The event processing section 111 activates the timer section 116.

Image Display (Non-Next-Image-Display-Ready) State S5

The image display (non-next-image-display-ready) state S5 is a state waiting for a response of the relay server device 200 to the previously transmitted next image acquisition request.

Figure 9A:
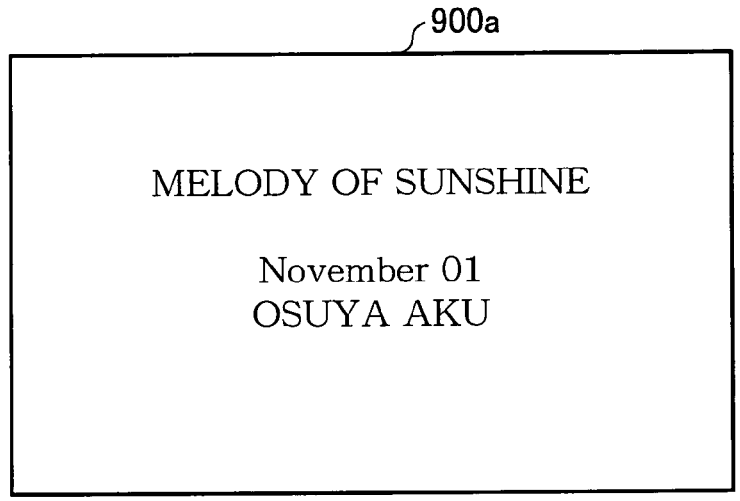
FIG. 9(a) is an illustration of the embodiment of the present invention and a display screen block diagram illustrating an example of the structure of a display screen shown on the display section in an image display (non-next-image-display-ready) state, the display screen including a head image.
Figure 9B:
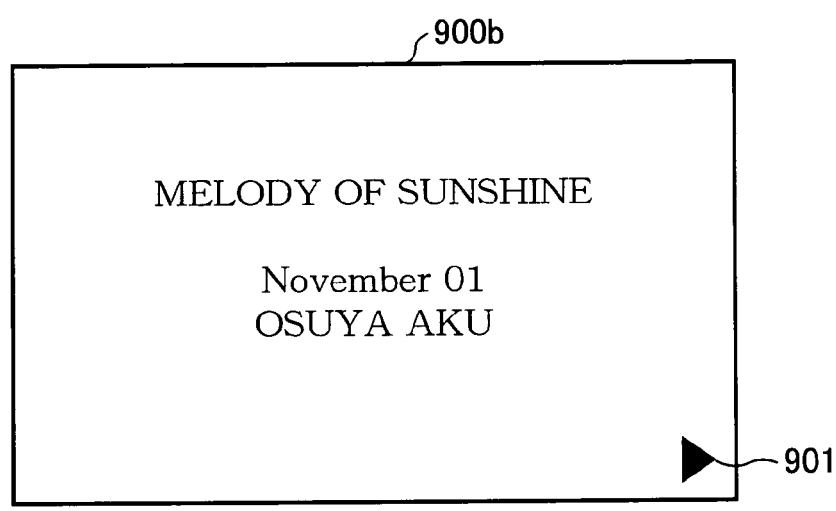
FIG. 9(b) is an illustration of the embodiment of the present invention and a display screen block diagram illustrating an example of the structure of the display screen shown on the display section in an image display (next-image-acquisition completed) state, the display screen including a head image
Figure 9C:
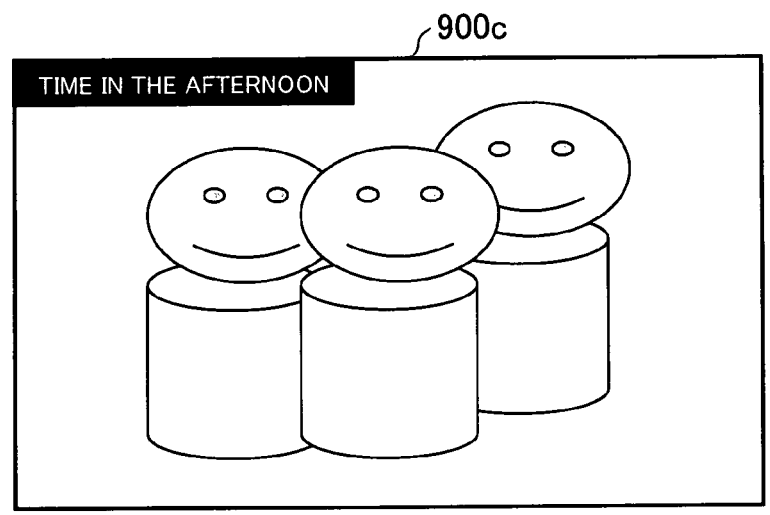
FIG. 9(c) is an illustration of the embodiment of the present invention and a display screen block diagram illustrating an example of the structure of the display screen shown on the display section in an image display (non-next-image-display-ready) state, the display screen including other image.

In the image display (non-next-image-display-ready) state S5, the image that has been already acquired is displayed on the display section 140. That is, in the case of transition from the operation guidance display (head-image-display-ready) state S4 to the state S5, the head image (selected image) is displayed on the display section 140. A display screen 900a illustrated in FIG. 9(a) is an exemplary display screen on which a head image of an album is displayed. In the case of transition from the image display (next-image-display-ready) state S6 to the state S5, which will be described later, a previous next image, i.e. an image which has been acquired in the image display (next-image-display-ready) state S6 is displayed on the display section 140. A display screen 900c illustrated in FIG. 9(c) is an exemplary display screen on which other image included in the album (e.g. fourth image in the album) is displayed as the previous next image. In the image display (non-next-image-display-ready) state S5, the event processing section 111 waits for an event E5a that the data managing section 112 has succeeded in acquiring a next image.

Upon completion of the acquisition of a next image transmitted from the relay server device 200 as a response to the next image acquisition request, the data managing section 112 transmits to the event processing section 111 data acquisition success notification that is a notification of the occurrence of the event E5a. Upon receipt of the data acquisition success notification, the event processing section 111 instructs the display screen creating section 113 to create a display screen for displaying the acquired next image on the display section 140.

In response to the instruction, the display screen creating section 113 creates the display screen for displaying the acquired next image on the display section 140, and then draws the created display screen off-screen. In a case where not only image data of the next image but also an image display screen creation script for displaying the next image have been acquired, the display screen creating section 113 creates a display screen from the image data of the next image in accordance with layout information of the image display screen creation script, and draws the created display screen off-screen. Here, in a case where the acquired image data of the next image is compressed image data, the display screen creating section 113 instructs the image data expanding section 114 to expand the image data. In response to the instruction, the image data expanding section 114 immediately expands the image data of the next image into displayable form. When the display screen creating section 113 has finished drawing the display screen off-screen, the event processing section 111 causes transition to the image display (next-image-display-ready) state S6.

After the transition to the image display (next-image-display-ready) state S6, the event processing section 111 instructs the display control section 115 to update the currently shown display screen 900a or 900c. In response to the instruction, the display control section 115 updates the display screen 900a illustrated in FIG. 9(a) to a display screen 900b illustrated in FIG. 9(b), for example, so as to present to the user that the next image is ready to be displayed. Especially, the display screen 900b includes a right arrow icon 901 as information indicating that the next image can be displayed with the press of the right button. The above-mentioned process for presenting to the user that the next image is ready to be display is a process for providing a better operating comfort for the user, and thus can be omitted.

When the next image is ready to be displayed, i.e. when (a) the acquisition of the image data of the next image and (b) the expansion of the image data of the next image have been completed, the event processing section 111 immediately causes transition to the image display (next-image-display-ready) state S6. In other words, the non-next-image-display-ready) state S5 is a state in which the next image is not ready to be displayed, i.e. a state in which the data managing section 112 has not yet completed acquiring the image data of the next image, or a state in which the image data expanding section 114 has not yet completed expanding the image data of the next image.

In the image display (non-next-image-display-ready) state S5, the event processing section 111 waits for the event E5b that the right button 163d has been pressed, an event E5c that is the an event that the data managing section 112 has failed in acquiring the next image, or an event E5d that a predetermined time period has elapsed since the timer section 116 was activated. The occurrence of the event E5b means that the user has instructed to display the next image in the image display (non-next-image-display-ready) state S5. The occurrence of the event E5d means that a given time period set by the timer section 116 has elapsed since the display of the currently displayed image was started, and the time has come to display the next image with the image display (non-next-image display-ready) state S5 still remained.

Upon detection of the press of the right button 163d that instructs to display the next image, the user operation analyzing section 117 transmits to the event processing section 111 operation information notification that is a notification of the occurrence of the event E5b. Upon receipt of the operation information notification, the event processing section 111 deactivates the timer section 116. When the timer section 116 is deactivated, the event processing section 111 causes transition to the thumbnail list display state S8.

Note that the user operation analyzing section 117 may transmit to the event processing section 111 operation information notification that is a notification of the occurrence of the event E5b, when the user operation analyzing section 117 detects that the right button 163d has been pressed once. Alternatively, the user operation analyzing section 117 may transmit to the event processing section 111 operation information notification that is a notification of the occurrence of the event E5b, when the user operation analyzing section 117 detects that the right button 163d has been pressed a predetermined number of times (e.g. three times) within a predetermined time period (e.g. one second). Further alternatively, the user operation analyzing section 117 may transmit to the event processing section 111 operation information notification that is a notification of the occurrence of the event E5b, only after the display control section 115 has caused the display section 140 to display a currently shown image thereon for a predetermined time period.

In a case where there is no response from the relay server device 200 within a predetermined time period after the transmission of the next image acquisition request, the data managing section 112 transmits to the event processing section 111 data acquisition failure notification that is a notification of the occurrence of the event E5c. Upon receipt of the data acquisition failure notification, the event processing section 111 recognizes that there is no next image to be displayed next, and causes transition to the next image absence state S7.

After a predetermined time period has elapsed since the timer section 116 was activated, the timer section 116 transmits to the event processing section 111 a timer notification that is a notification of the occurrence of the event E5d. Upon receipt of the timer notification in the image display (non-next-image-display-ready) state S5, the event processing section 111 activates the timer section 116 again. In this case, the event processing section 111 waits for the event E5a through E5d again, without causing transition to another state.

Image Display (Next-Image-Display-Ready) State S6

The next-image-display-ready state S6 is a state in which the next image to be displayed next is ready to be displayed and a state waiting for the timing at which the next image is to be displayed. Even when the event processing section 111 causes transition from the image display (non-next-image-display-ready) state S5 to the image display (next-image-display-ready) state S6, the display screens 900a through 900c are kept displayed without being updated. In addition, especially, the right arrow icon 901 may be displayed as information indicating that the next image can be displayed with a press of the right button.

In the image display (next-image-display-ready) state S6, the event processing section 111 waits for an event E6a that a predetermined time period has elapsed since the activation of the timer section 116, or an event E6b that the right button 163d has been pressed. Here, the occurrence of the event E6a means that a predetermined time period set by the timer section 116 has elapsed since display of the currently displayed image was started, and the time has come to display the next image. The occurrence of the event E6b means that the user has instructed to display the next image.

After a predetermined time period has elapsed since the timer section 116 was activated, the timer section 116 transmits to the event processing section 111 a timer notification that is a notification of the occurrence of the event E6a. Upon detection of the press of the right button 163d that instructs to display the next image, the user operation analyzing section 117 transmits to the event processing section 111 operation information notification that is a notification of the occurrence of the event E6b. Upon receipt of either the timer notification or the operation information notification, the event processing section 111 causes transition to the image display (non-next-image-display-ready) state S5.

After the transition to the image display (non-next-image-display-ready) state S5, the event processing section 111 instructs the display control section 115 to display the next image on the display section 140. The display control section 115 causes the display section 140 to display thereon a display screen for displaying the next image which has been already drawn off-screen. Then, the event processing section 111 instructs the data managing section 112 to acquire a new next image to be displayed subsequent to the image currently displayed on the display section 140 (i.e. image hereinbefore referred to as next image). The data managing section 112 transmits to the relay server device 200 a next image acquisition request for acquiring the new next image. Further, the event processing section 111 activates the timer section 116 again.

Image Display (Next Image Absence) State S7

The image display (next image absence) state S7 is a state in which the data managing section 112 has failed in acquiring the next image to be displayed next from the relay server device 200. For example, the following case applies, that is, a case when an attempt was made to acquire a 37th image although the album displayed in slideshow display is an album that consists of 36 images.

In the image display (next image absence) state S7, the event processing section 111 waits for an event E7a that a predetermined time period has elapsed since the activation of the timer section 116 or an event E7b that the right button 163d has been pressed. The occurrence of the event E7a or E7b in the image display (next image absence) state S7 means that although it is impossible to acquire the next image to be displayed, the time has come to display the next image or the user has instructed to display the next image.

In a case where these events have occurred in the image display (next image absence) state S7, the event processing section 111 also causes transition to the thumbnail list display state S8.

Thumbnail List Display State S8

The thumbnail list display state S8 is a state in which thumbnails of images included in an album are displayed in list view. That is, in the thumbnail list display state S8, the display control section 115 causes the display section 140 to display a thumbnail list view screen thereon.

Figure 10:
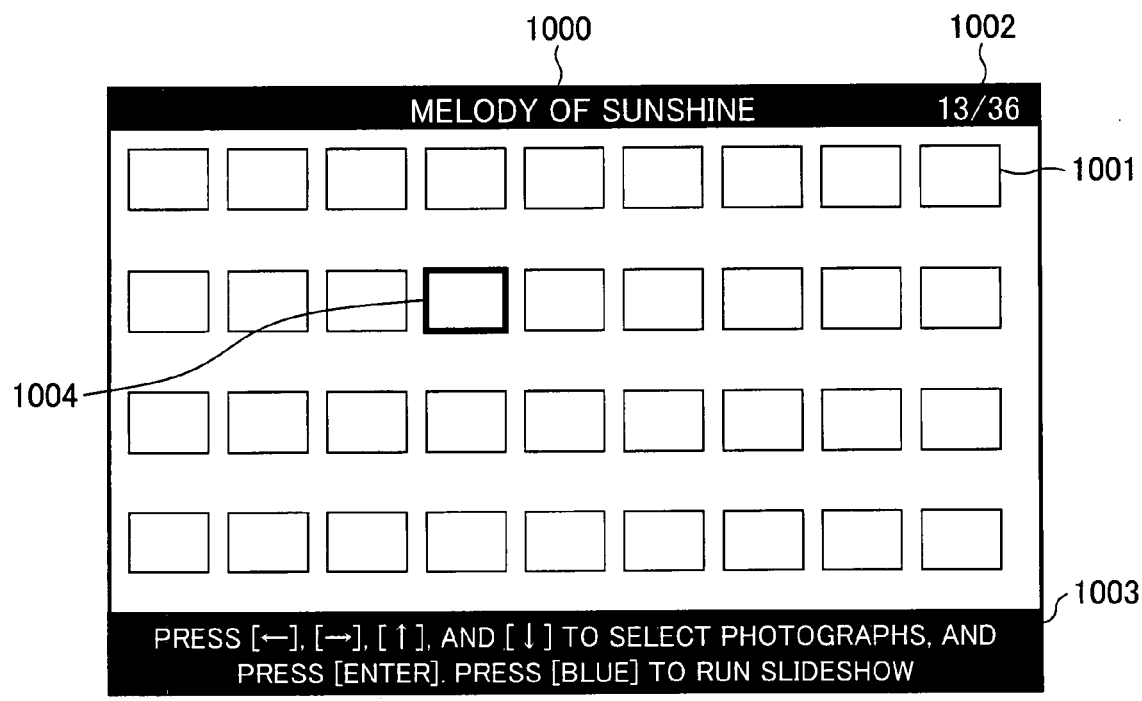
FIG. 10 is an illustration of the embodiment of the present invention and a display screen block diagram illustrating an example of the structure of a display screen shown on the display section in a thumbnail list display state.

FIG. 10 is a display screen block diagram illustrating an exemplary structure of a thumbnail list view screen 1000 which the display control section 115 causes the display section 140 to display in the thumbnail list display state S8. As illustrated in FIG. 10, the thumbnail list view screen 1000 includes a plurality of thumbnails 1001, a title display area 1002 where a title of an album is displayed, and a available command display area 1003 where commands that the user can enter are displayed in list view. The thumbnail 1001 is a reduced image of an image included in an album. In FIG. 10, 36 thumbnails 1001 of 36 images included in the album are arranged and displayed in list view on the thumbnail list view screen 1000. Note that the thumbnails 1001 displayed on the thumbnail list view screen 1000 may be all thumbnails of a plurality of images included in an album or may be a part of the thumbnails.

In a state where the thumbnail list view screen 1000 as illustrated in FIG. 10 is displayed, the event processing section 111 waits for notification of an event. The events to which the event processing section 111 responds in the thumbnail list display state S8 is an event E8a that the upward, downward, left, or right button of the cross button section 163 has been pressed and an event E8b that the enter button 163e has been pressed.

Upon detecting a press of any of the upward, downward, left, and right buttons of the remote controller 160, the user operation analyzing section 117 transmits to the event processing section 111 an operation information notification that is a notification of the occurrence of the event E8a. The operation information notification includes information indicative of which button of the upward, downward, left, and right buttons has been pressed. Upon receipt of the operation information notification, the event processing section 111 updates thumbnail selection state information in accordance with which button has been pressed. The thumbnail selection state information indicates which thumbnail has been selected from among the thumbnails displayed in list view. Further, the event processing section 111 instructs the display control section 115 to update a display screen. In response to the instruction, the display control section 115 highlights a thumbnail currently selected in the thumbnail list view screen 100, in accordance with the thumbnail selection state information.

When the user operation analyzing section 117 detects that the enter button 163e of the remote controller 160 has been pressed, the user operation analyzing section 117 transmits to the event processing section 111 an operation information notification that is a notification of the occurrence of the event E8b. Upon receipt of the operation information notification, the event processing section 111 causes transition to the foregoing operation guidance display (non-head-image-displayready) state S3. Further, the event processing section 111 determines a selected image that is selected at a point in time when the event E8b occurs, in accordance with the thumbnail selection state information, and instructs the data managing section 112 to acquire the selected image. The data managing section 112 transmits to the relay server device 200 a selected image acquisition request for acquiring the selected image.

Error State S9

The error state S9 is a state to which transition is caused when abnormality has occurred in the above processes. In the error state S9, the display control section 115 causes error display screens 1100a through 1100c as illustrated in FIG. 11.

Figure 8A:
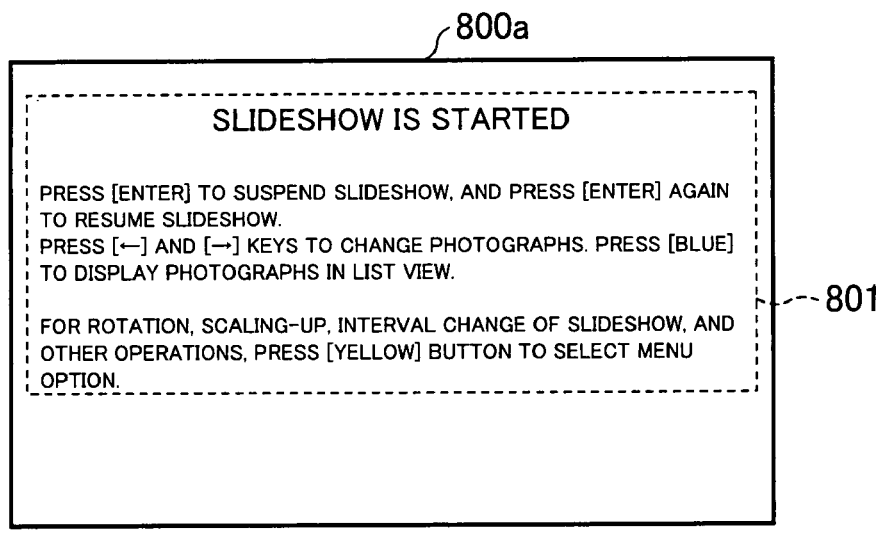
FIG. 8(a) is an illustration of the embodiment of the present invention and a display screen block diagram illustrating an example of the structure of a display screen shown on the display section in an operation guidance display (non-head-image-display-ready) state.
Figure 8B:
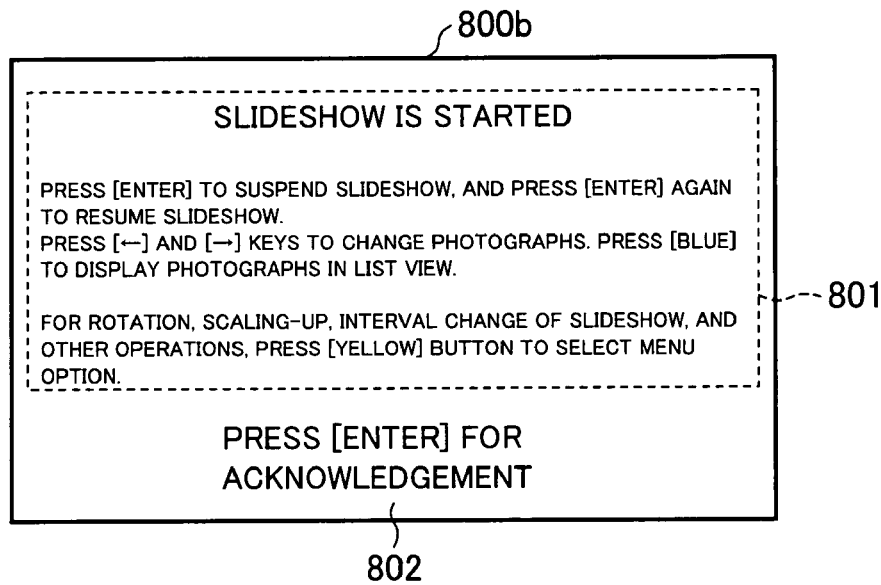
FIG. 8(b) is an illustration of the embodiment of the present invention and a display screen block diagram illustrating an example of the structure of the display screen shown on the display section in an operation guidance display (head-image-display-ready) state.
Figure 11:
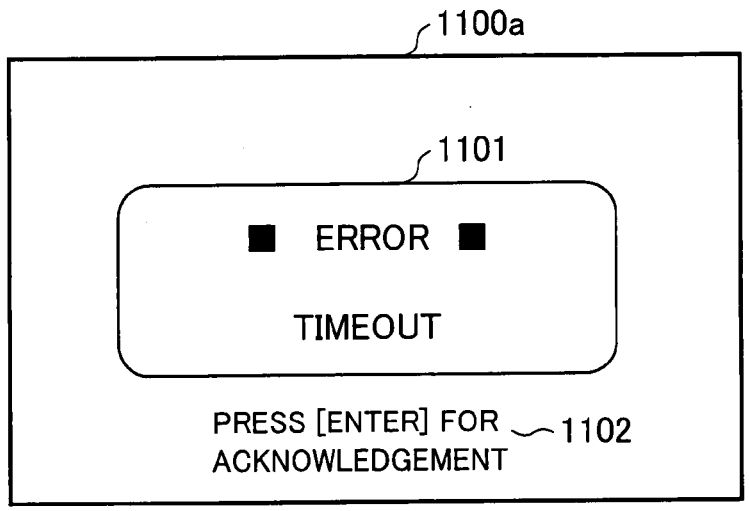
FIG. 11(a) is an illustration of the embodiment of the present invention and a display screen block diagram illustrating an example of the structure of a display screen shown on the display section in an error state.
FIG. 11(b) is an illustration of the embodiment of the present invention and a display screen block diagram illustrating another example of the structure of the display screen shown on the display section in the error state.
FIG. 11(c) is an illustration of the embodiment of the present invention and a display screen block diagram illustrating still another example of the structure of the display screen shown on the display section in the error state.
Figure 11:
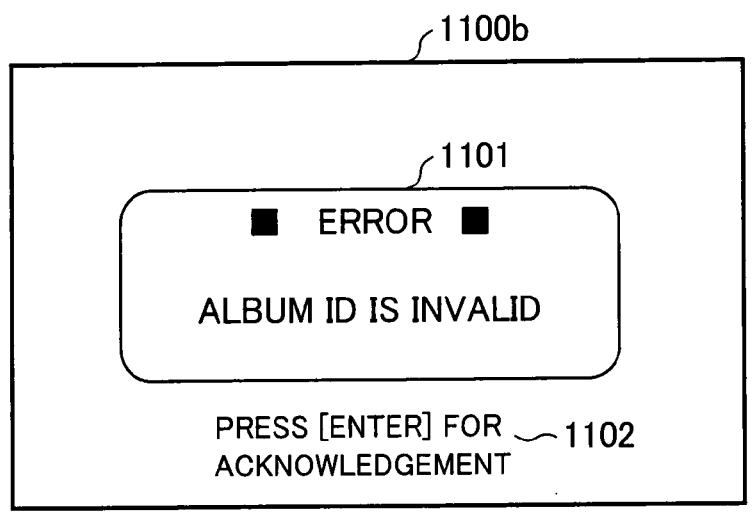
Figure 11:
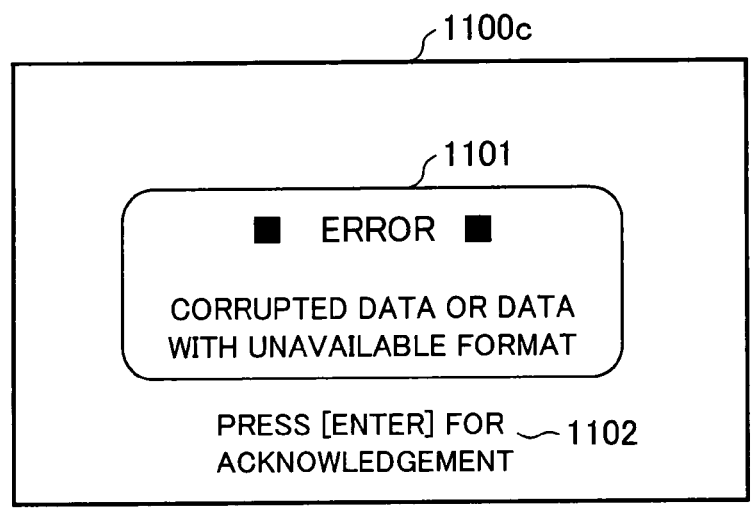

FIG. 11 is a display screen block diagram illustrating an exemplary structure of an error display screen which the display control section 115 causes the display section 140 to display when error occurs. The error display screen 1100a illustrated in FIG. 11(a) is an exemplary error display screen which is displayed when there has been no response of the relay server device 200 to the album information acquisition request within a predetermined time period. An error display screen 1100b illustrated in FIG. 8(b) is an exemplary error display screen which is displayed when an album having an album ID designated by a user is not managed under the relay server device 200. An error display screen 1100c illustrated in FIG. 11(c) is an exemplary error display screen which is displayed when there is something wrong with image data acquired as a response to the foregoing head image acquisition request.

As illustrated in FIG. 11, each of the error display screens 1100a through 1100c includes an error information display area 1101 and an available command display area 1102. The error information display area 1101 includes a character string representing the type of error caused. The available command display area 1102 is an area where commands that the user can enter are displayed in list view. In the available command display area 1102, it is shown that the user can inform that the user has acknowledged error information with a press of the enter button 163e.

In a state where the error display screens 1100a through 1100c as illustrated in FIG. 11 are displayed, the event processing section 111 waits for the occurrence of an event E9a that the enter button 163e has been pressed.

When the user operation analyzing section 117 detects that the enter button 163e of the remote controller 160 has been pressed, the user operation analyzing section 117 transmits to the event processing section 111 an operation information notification that is a notification of the occurrence of the event E9a. Upon receipt of the operation information notification, the event processing section 111 causes transition to the album ID designation state S1, which is an initial state.

A state transition table is shown below. The state transition table is referred to by the event processing section 111 in order to perform the above processes. In the state transition table below, each row shows any of the foregoing nine states, and each column shows an event to which the event processing section 111 responds. Each cell is divided into three rows, in which a first row shows a pre-transition process, a second row shows a transition destination, and a third row shows a post-transition process. A blank field in the table indicates that a process to be performed or a transition process is not defined.

TABLE 1

|  | Press of numeric button | Press of enter button | Press of upward, downward, left, or right button | Success of data acquisition | Failure of data acquisition | Timer |
|---|---|---|---|---|---|---|
| S1: Album ID designation state | Update album ID | Transition to S2 Album information acquisition request | Update album selection state information | | | |
| S2: Album information acquisition state | | | | Transition to S3 Head image acquisition request | Transition to S9 | |
| S3: Operation guidance display (non-head-image-display-ready) state | | | | Create head image display screen Transition to S4 Update display screen | Transition to S9 | |
| S4: Operation guidance display (head-image-display-ready) state | | Transition to S5 Image display Next image acquisition request Activate time section | | | | |
| S5: Image display (non-next-image-display-ready) state | | | Deactivate timer section Transition to S8 | Create next image display screen Transition to S6 Update display screen | Transition to S7 | Reactivate timer section |
| S6: image display (next-image-display-ready) state | | | Transition to S5 Image display Next image acquisition request | | | Transition to S5 Image display Next image acquisition request |

TABLE 1-continued

| | Press of numeric button | Press of enter button | Press of upward, downward, left, or right button | Success of data acquisition | Failure of data acquisition | Timer |
|---|---|---|---|---|---|---|
| S7: Image display (next image absence) state | | | Activate time section Transition to S2 | | Activate time section Transition to S2 | |
| S8: Thumbnail list display state | | | Update thumbnail selection state information | | | |
| | | Transition to S3 Selected image acquisition request | | | | |
| S9: Error state | | Transition to S1 | | | | |

Note that the state transition table may be stored in advance in the slideshow display device 100, for example, in the storage section 130. Alternatively, the state transition table may be the one that the slideshow display device 100 acquires from the relay server device 200 through the communication section 120. In the latter case, the communication section 120 of the slideshow display 100 may be arranged to acquire the state transition table at once before or at the time of starting a slideshow display, or may be arranged to separately acquire sets of state transition definition information in the rows of the state transition table. The state transition definition information can be described in MTD (Message Template Definition) which is XML compliant. The state transition definition information described in MTD is transmitted from the relay server device 200 to the slideshow display device 100 in such a manner that the state transition definition information is embedded into a thumbnail list view screen creation script or an image display screen creation script, which is XML data, or the state transition definition information is treated as a script that is independent from these display screen creation scripts.

As described above, the control section 110 performs slideshow display according to the state transition diagram. In a case where there is no display delay caused by image data acquisition, the control section 110 causes images included in an album to be displayed in succession while alternately causing transition from the image display (non-next-image-display-ready) state S5 to the image display (next-image-display-ready) state S6 and transition from the image display (next-image-display-ready) state S6 to the image display (non-next-image-display-ready) state S5. During the image display, the control section 110 causes the display section 140 to display each image thereon for a predetermined image display time period, which is set in advance by the timer section 116. After the predetermined image display time period has elapsed, the control section 110 causes the display section 140 to display thereon a next image, which is an image to be displayed next. In this manner, a plurality of images included in an album are displayed in succession on the display section 140.

The feature of the control section 110 is that when the event E5b occurs in the image display (non-next-image-display-ready) state S5, the control section 110 causes transition from the image display (non-next-image-display-ready) state S5 to the thumbnail list display state S8. More specifically, when the user operation analyzing section 117 receives a next image display instruction (operation information notification given with a press of the right button 163d) for instructing display of a next image in the image display (non-next-image-display-ready) state where the next image is not ready to be displayed, a thumbnail list is displayed instead of a next image. This solves the problem that the user keeps waiting after instructing to display a next image with a press of the right button 163d until the next image gets ready to be displayed.

Further, the data managing section 112 of the control section 110 acquires a thumbnail group required for thumbnail list display, as album information, in the album information acquisition state S2. More specifically, the data managing section 112 acquires image data of thumbnails displayed in list view in the thumbnail list display state S8, before the time to display a target image in a slideshow. The display screen creating section 113 of the control section 110 performs creation of a display screen for thumbnail list display on the display section 140, as a post-transition process at the transition from the album acquisition state S2 to the operation guidance display (non-head-image-display-ready) state S3. That is, the thumbnail list view screen is created by the display screen creating section 113 before the time to display a target image in a slideshow. As such, the display control section 115 of the control section 110 can immediately display a thumbnail list view on the display section 140 when transition to the thumbnail list display state S8 is caused.

(Details of the Foregoing Processes)

The following description will discuss details of some processes performed in the above-mentioned states with reference to flowcharts.

Process for Displaying a Target Image

Figure 12:
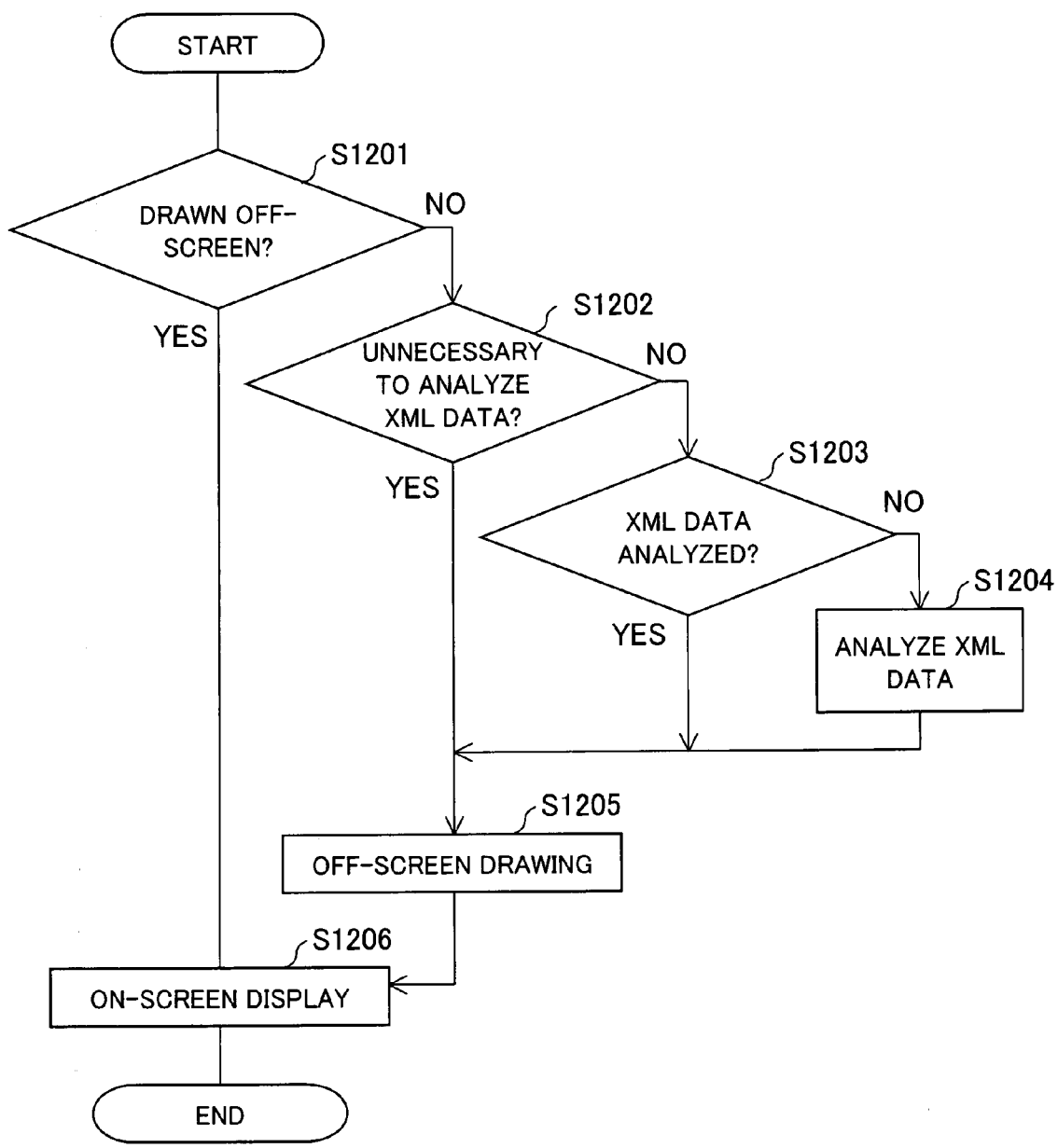
FIG. 12 is an illustration of the embodiment of the present invention and a flowchart showing an example of a target image displaying process.

First of all, the process for displaying a target image on the display section 140 will be discussed with reference to FIG. 12. FIG. 12 is a flowchart showing series of operations performed to display a target image.

The display screen creating section 113 determines whether a target image to be displayed has been drawn off-screen (S1201), whether it is unnecessary to analyze the image display screen creation script (XML data) (S1202), and/or whether the image display screen creation script (XML data) has been analyzed (S1203).

In a case where images are navigated back and forth through at the user operation in the slideshow display, an image that has been displayed once is likely to have been drawn off-screen. In S1201, it is determined whether a target image to be displayed has been drawn off-screen.

Further, in a case where the display screen creating section 113 has acquired not only a target image but also an image display screen creation script, the display screen creating section 113 creates a display screen including the target image in accordance with the image display screen creation script (XML data). As such, it is determined in S1202 whether it is necessary to analyze the image display screen creation script described in SVG which is XML compliant. In a case where a target image is the one that has been recently displayed, a result of analysis of the image display script (XML data) is likely to have been stored in a cache. In S1203, it is determined whether the XML data has been analyzed.

According to the results of the determinations, the display screen creating section 113 creates a display screen for displaying a target image. More specifically, the display screen creating section 113 analyzes the image display screen creation script (XML data) to create the display screen in Step S1204, and draws the created display screen off-screen in Step S1205. It is determined in S1201 through S1203 whether the above-mentioned steps are necessary. If unnecessary, the steps are omitted. S1206 is a step in which the display control section 115 causes the display section 140 to display the display screen thereon on-screen. The display control section 115 can perform on-screen display in a short time since the display control section 115 performs only on-screen display of the display screen that has been already drawn off-screen by the display screen creating section 113.

Process for Displaying Thumbnails in List View

Figure 13:
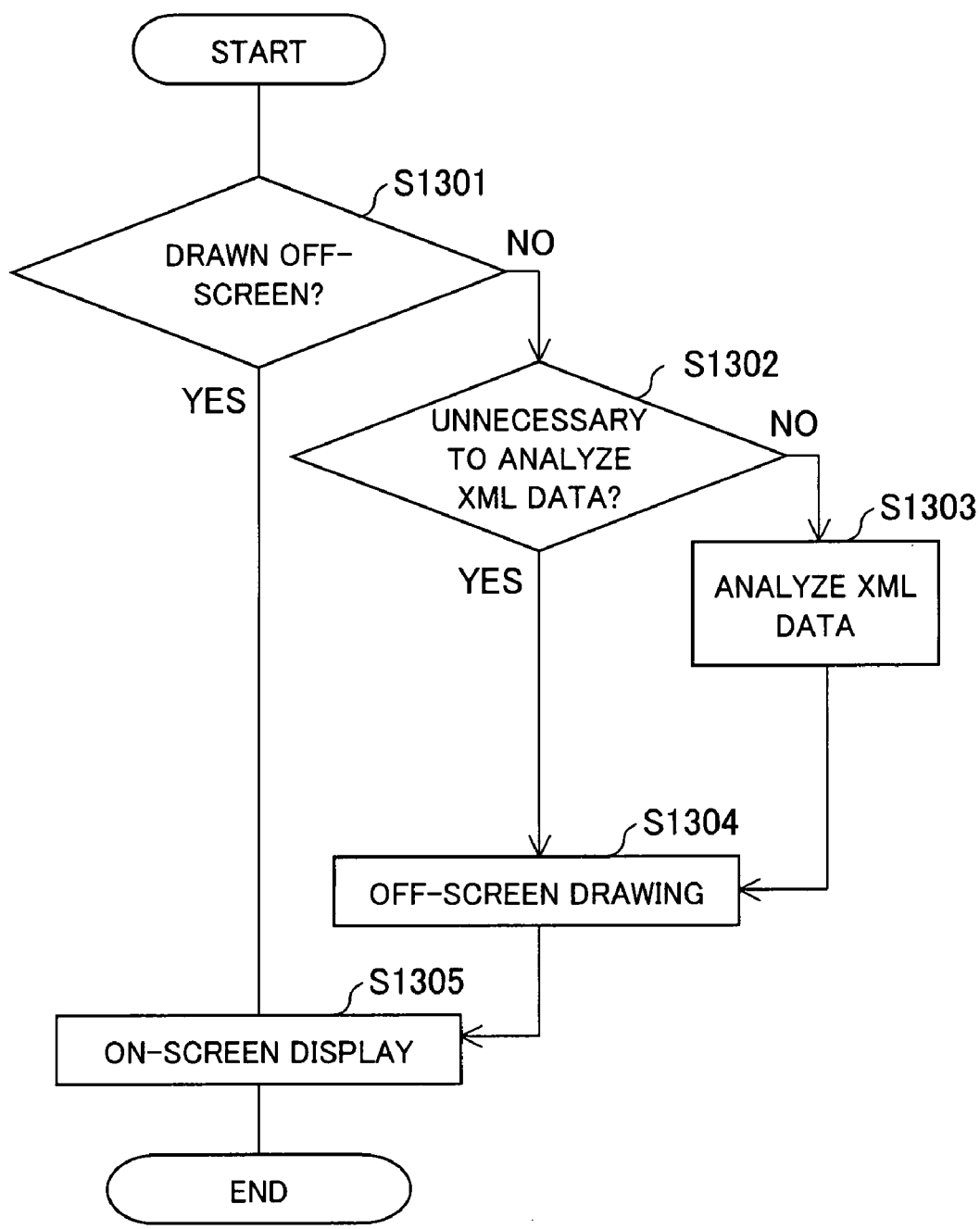
FIG. 13 is an illustration of the embodiment of the present invention and a flowchart showing an example of a thumbnail list displaying process.

Next, the process for displaying thumbnails in list view will be discussed with reference to FIG. 13. FIG. 13 is a flowchart showing series of operations performed to display thumbnails in list view.

The display screen creating section 113 determines whether a thumbnail list view screen to be displayed has been drawn off-screen (S1301) and/or whether a thumbnail list view screen creation script (XML data) has been analyzed (S1302).

In the slideshow display, the thumbnail list view screen is acquired at an early stage (Album information acquisition state S2: see FIG. 5), and drawn off-screen. The thumbnail list view screen is therefore likely to have been drawn off-screen. In S1301, it is determined whether the thumbnail list view screen has been drawn off-screen. In a case where a thumbnail list display is performed for the second and subsequent times, a result of analysis of the thumbnail list view screen creation script (XML data) is likely to have been stored in a cache. In S1302, it is determined whether the XML data has been analyzed.

According to the results of the determinations, the display screen creating section 113 creates a thumbnail list view screen. More specifically, the display screen creating section 113 analyzes the thumbnail list view screen creation script described in XML-compliant SVG to create the thumbnail list view screen in S1303, and draws the created display screen off-screen in S1304. It is determined in S1301 and S1302 whether the above-mentioned steps are necessary. If unnecessary, the steps are omitted. S1305 is a step in which the display control section 115 causes the display section 140 to display the display screen thereon on-screen. The display control section 115 can perform on-screen display in a short time since the display control section 115 performs only on-screen display of the display screen that has been already drawn off-screen by the display screen creating section 113.

Figure 14:
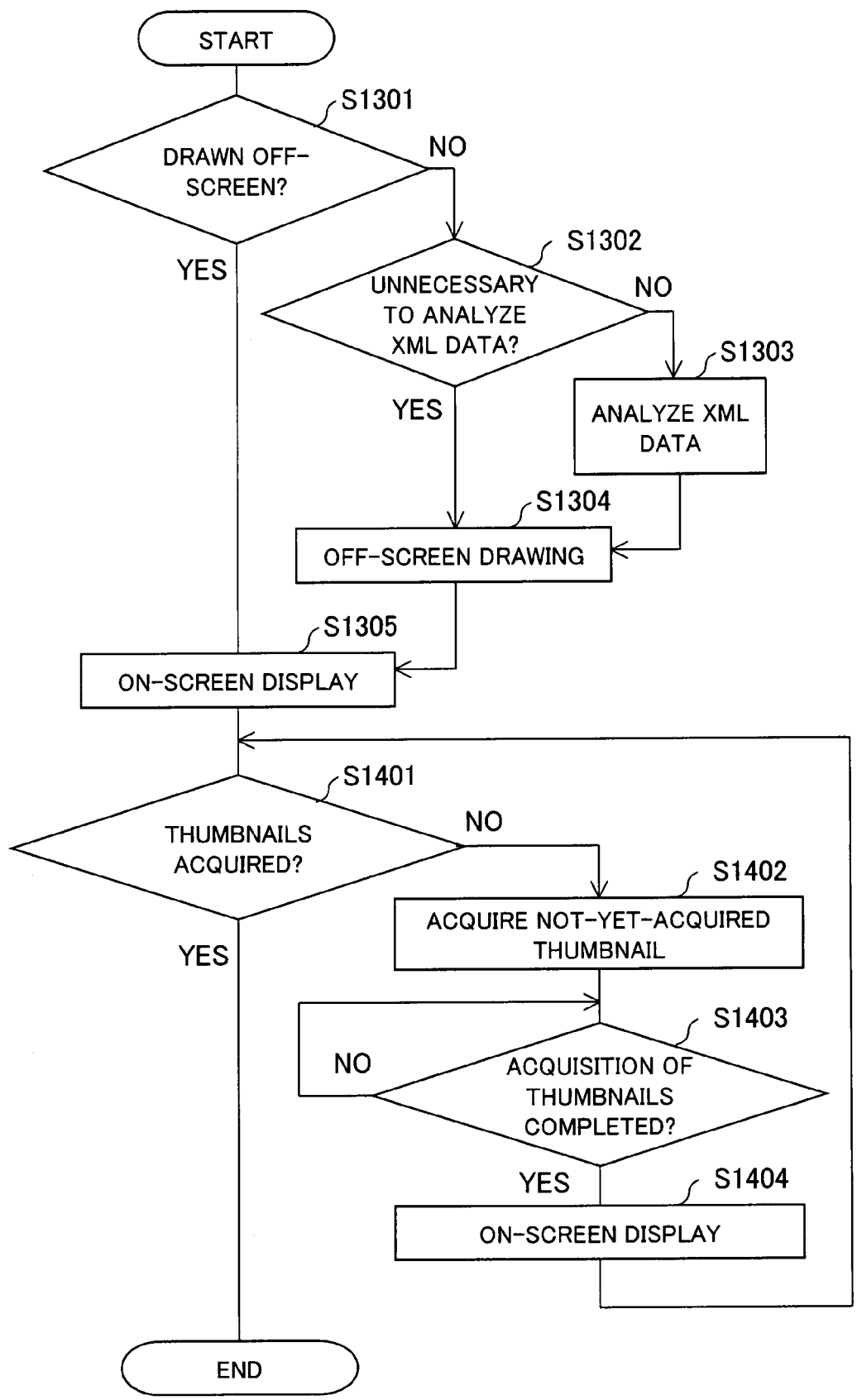
FIG. 14 is an illustration of the embodiment of the present invention and a flowchart showing another example of the thumbnail list displaying process.

Note that the above description has discussed, as one mode to reduce a time required for thumbnail list display, the arrangement in which image data of thumbnails are acquired as part of album information right after the start of the slideshow. However, alternative arrangement may be adopted in which image data of thumbnails are not acquired until there arises the necessity for thumbnail list display. This is because data size of the image data of thumbnail images is small. FIG. 14 is a flowchart showing an exemplary thumbnail list display process performed in the alternative arrangement.

The flowchart illustrated in FIG. 14 is different from the flowchart illustrated in FIG. 13 in that S1401 through S1404 are added. In S1401 through S1404, image data of thumbnail images are acquired and displayed. The other operations, which are the same as those shown in FIG. 13, are given identical reference numerals, and explanation thereof is omitted. The operations shown in FIG. 14 are different from the operations shown in FIG. 13 in that even though there is not-yet-acquired image data of a thumbnail to be displayed in list view, a display screen is created without such a thumbnail, and drawn on-screen.

In S1401 through S1404, not-yet-acquired thumbnails are acquired in succession, the acquired thumbnails are displayed on the already shown list view screen in the order in which they are acquired. More specifically, it is determined in S1401 whether there is a not-yet-acquired thumbnail. If there is a not-yet-acquired thumbnail, the data managing section 112 acquires image data of the not-yet-acquired thumbnail from the relay server device 200 (S1402). When the acquisition of the image data is completed (S1403), the display control section 115 displays the acquired thumbnail image on-screen on the already shown list view screen (S1404). The above process is repeated until all of the not-yet-acquired images are acquired so that the thumbnail list view screen is displayed on the display section 140.

Process for Acquiring Various Kinds of Data

Figure 15:
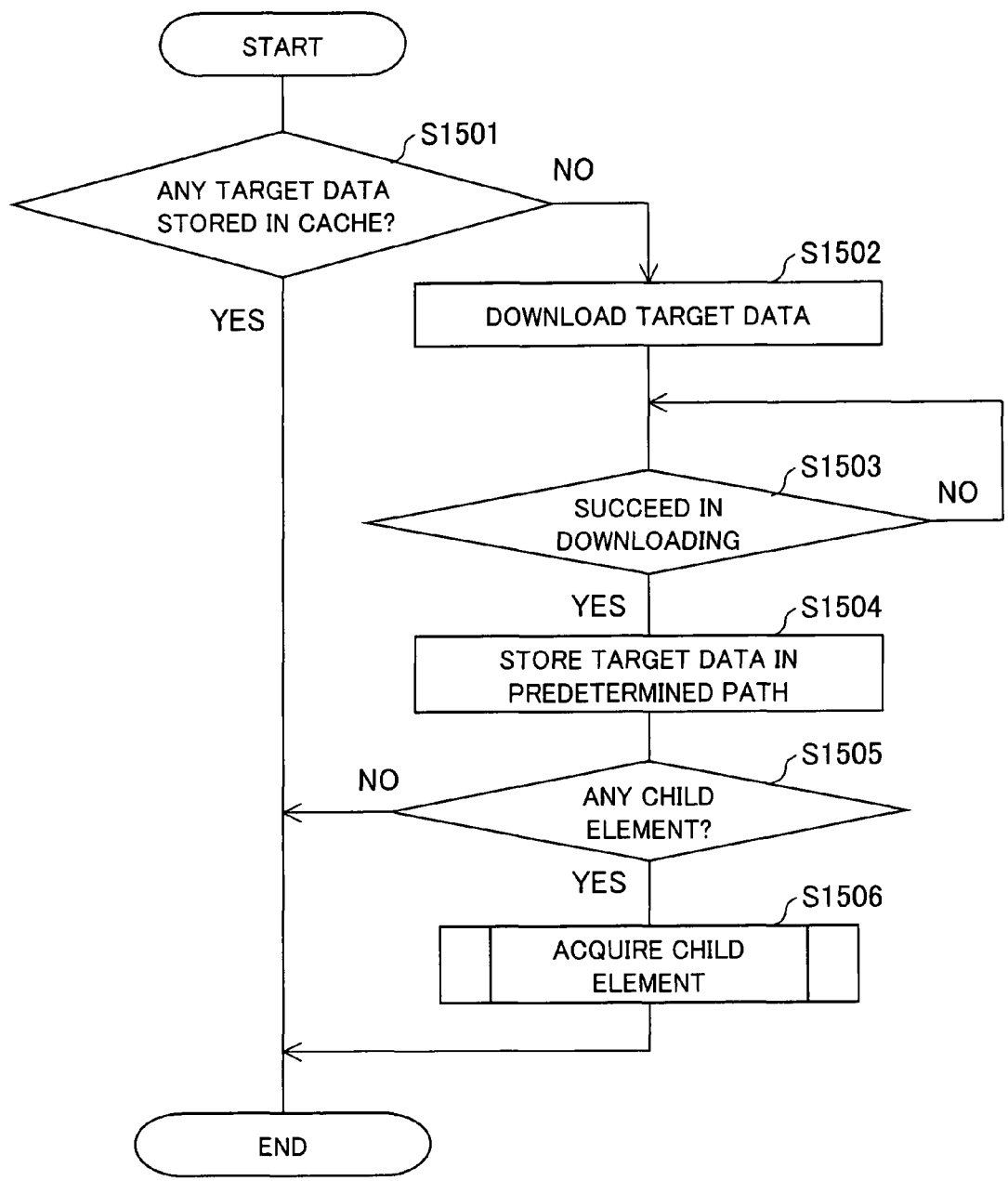
FIG. 15 is an illustration of the embodiment of the present invention and a flowchart showing an example of a various data acquiring process.
Figure 16:
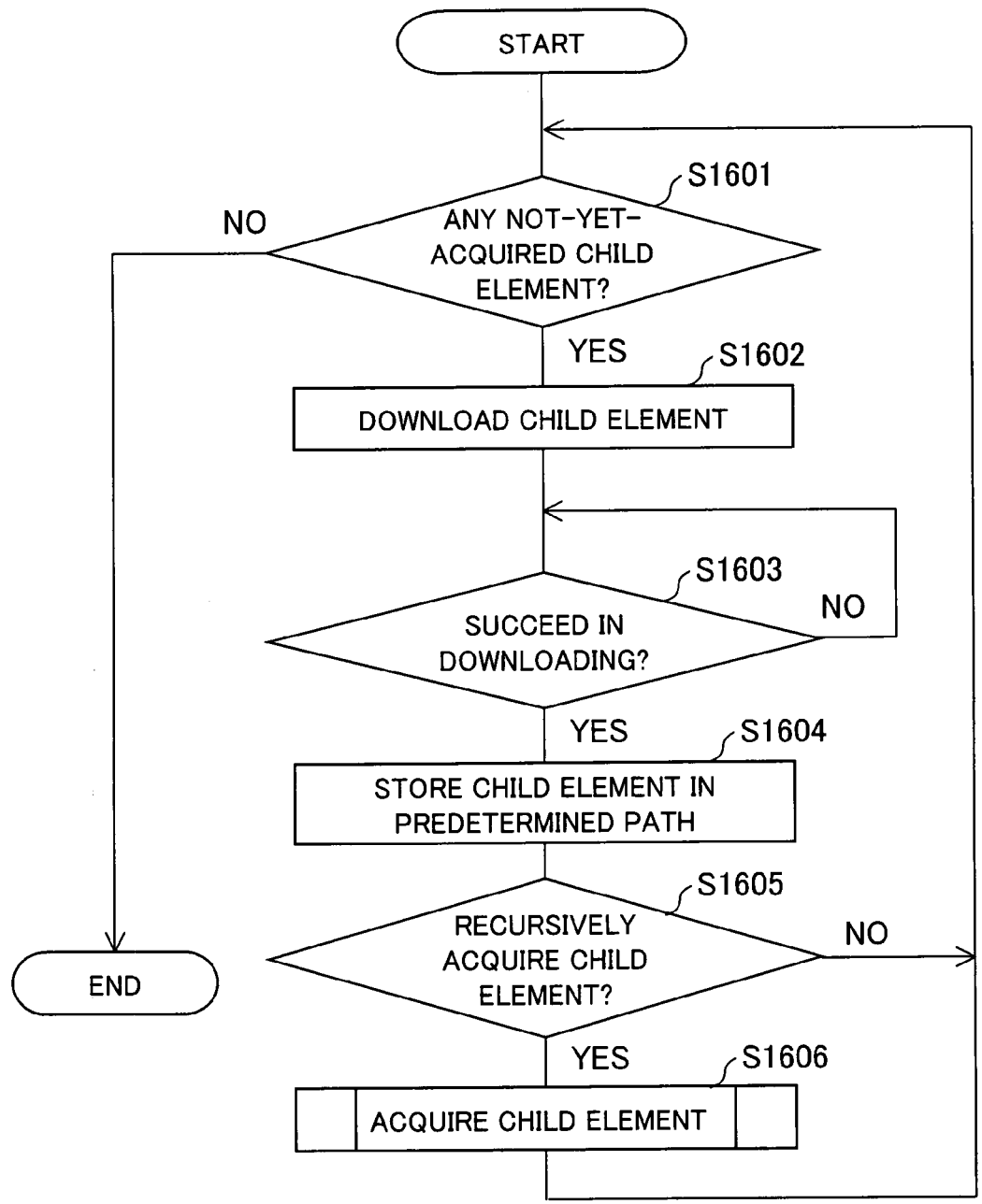
FIG. 16 is an illustration of the embodiment of the present invention and a flowchart showing a child element acquiring process included in the various data acquiring process.

Next, the process for the data managing section 112 acquiring various kinds of data will be discussed with reference to FIGS. 15 and 16. FIG. 15 is a flowchart showing series of operations performed to acquire various kinds of data. FIG. 16 is a flowchart showing series of operations performed to acquire a child element of target data to be acquired if there is the child element.

The data managing section 112 determines whether target data to be acquired has been stored in advance in a cache (S1501). In a case where the target data has not been stored in advance in a cache, the data managing section 112 downloads the target data from the relay server device 200 through the communication section 120 (S1502). Then, the data managing section 112 determines whether it has succeeded in downloading the target data (S1503). If succeeded, the data managing section 112 stores the downloaded target data in a predetermined path of the storage section 130 (S1504). Here, in a case where the target data has such data structure that a child element like XML data is referred to (YES in S1505) by the target data, the data managing section 112 analyzes the target data to acquire the child element of the target data (S1506).

FIG. 16 illustrates sub-steps performed in a child element acquiring step S1506 of FIG. 15. In the child element acquiring step S1506, it is determined whether there is a not-yet-acquired child element (S1601). If there is a not-yet-acquired child element, the data managing section 112 downloads the child element from the relay server device 200 through the communication section 120 (S1602). Then, the data managing section 112 determines whether it has succeeded in downloading the child element (S1603). If succeeded, the data managing section 112 stores the downloaded child element into a predetermined path of the storage section 130 (S1604).

The data managing section 112 may be adjusted so as to acquire only a child element to be directly referred to by the target data, or may be adjusted so as to recursively acquire a child element referred to by another child element. S1605 is a step of determining in which manner the data managing section 112 is adjusted. In a case where the data managing section 112 is adjusted so as to acquire only a child element to be directly referred to by the target data, the data managing section 112 returns to S1601 to acquire a next child element to be directly referred to by the target data. The data managing section 112 repeats the above operations until all of the not-yet-acquired child elements are acquired, so that the data managing section 112 completes acquisition of all of the child elements referred to by the target data. In a case where the data managing section 112 is adjusted so as to recursively acquire a child element referred to by another child element, the data managing section 112 repeats the above operations to acquire a child element referred to by the child element which has been already acquired, so that the data managing section 112 can acquire all the child elements including a first-generation child element directly referred to by the target data and a second-generation child element referred to by the first-generation child element, without omission.

Operation of the Event Processing Section 111

Figure 17:
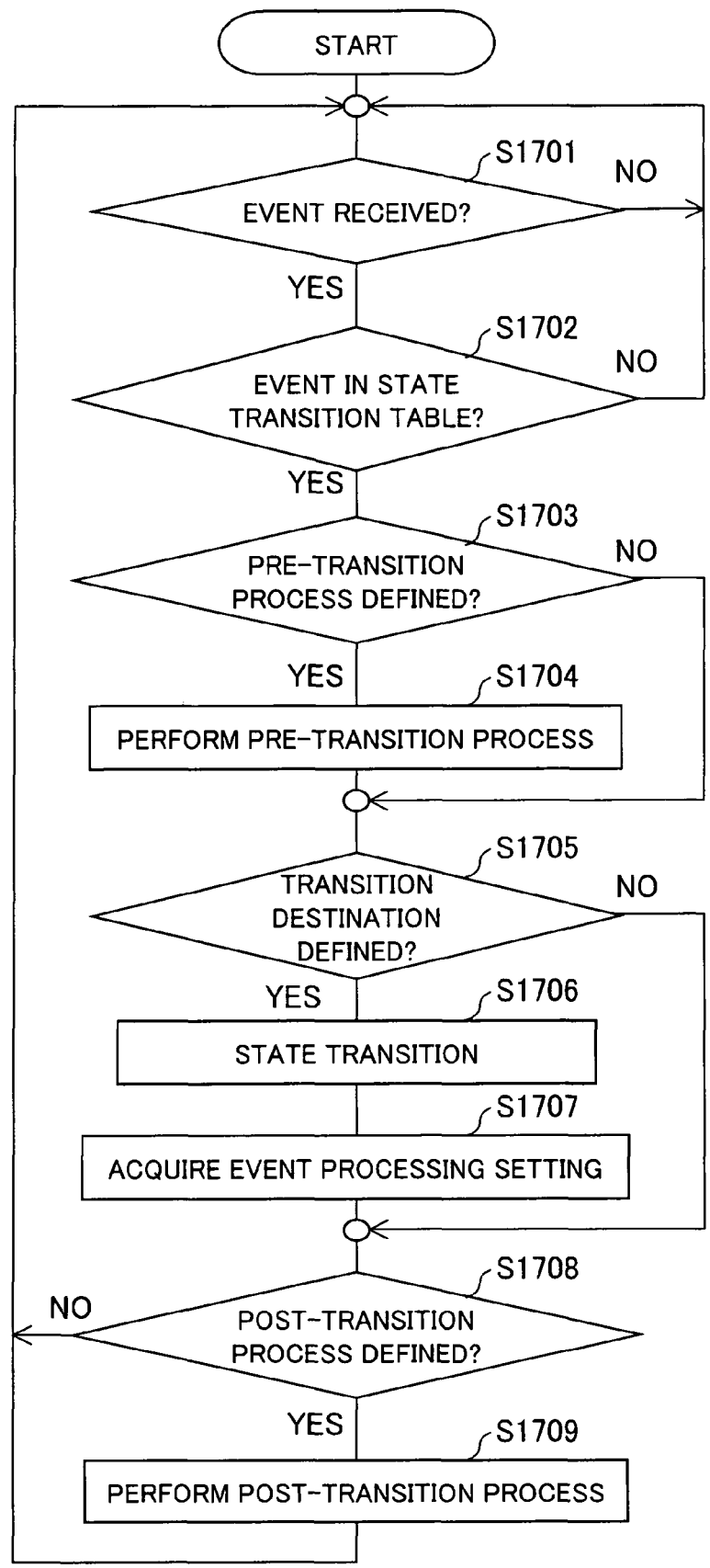
FIG. 17 is an illustration of the embodiment of the present invention and a flowchart showing a process performed by an event processing section.

Next, the operation of the event processing section 111 will be discussed with reference to FIG. 17. FIG. 17 is a flowchart showing series of operations performed by the event processing section 111.

As illustrated in FIG. 17, the event processing section 111 waits for an event notification while repeating an event reception determining step S1701 of determining whether the event notification has been received. Upon receipt of the event notification, the event processing section 111 determines whether the received event is defined in the state transition table of Table 1 (S1702). In a case where the received event is not defined in the state transition table, the event processing section 111 waits for a next event without performing operation.

In a case where the received event is defined in the state transition table, the event processing section 111 determines whether the pre-transition process to be performed in response to the received event is defined in the state transition table (S1703). In a case where the pre-transition process of the received event is not defined in the state transition table, the event processing section 111 proceeds to S1705, which will be described later. In a case where the pre-transition process of the received event is defined in the state transition table, the event processing section 111 controls the sections of the control section 110 to perform the defined pre-transition process (S1704).

Then, the event processing section 111 determines whether a transition destination according to the received event is defined in the state transition table (S1705). In a case where the transition destination is defined, the event processing section 111 causes transition to the defined state (S1706). Note that the state transition is realized by updating a value of a state variable stored in RAM, for example. When completing the state transition, the event processing section 111 acquires an event processing setting (S1707).

Then, the event processing section 111 determines whether a post-transition process to be performed in response to the received event is defined in the state transition table (S1708). In a case where the post-transition process of the received event is not defined, the event processing section 111 returns to S1701 to wait for a next event without performing operation. In a case where the post-transition process of the received event is defined in the state transition table, the event processing section 111 controls the sections of the control section 110 to perform the defined post-transition process (S1709). Thereafter, the event processing section 111 returns to S1701 to wait for a next event.

(Relay Server Device 200)

Figure 18:
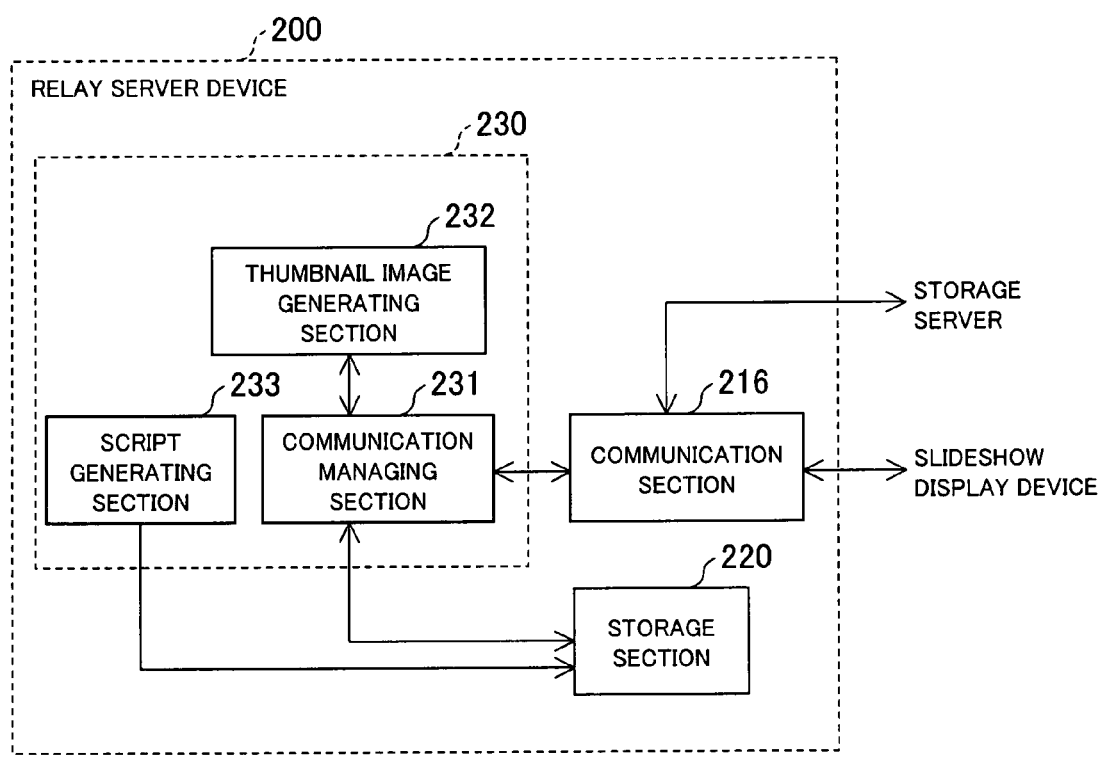
FIG. 18 is an illustration of the embodiment of the present invention and a functional block diagram illustrating a primary structure of a relay server device.

Finally, the following description will briefly discuss the relay server device 200 (image data transmitting device) illustrated in FIG. 2, with reference to FIG. 18. FIG. 18 is a functional block diagram illustrating a primary structure of the relay server device 200.

As illustrated in FIG. 18, the relay server device 200 generally includes a communication section 216, a storage section 220, and a control section 230. The communication section 216 is a communication interface for transmitting and receiving data to and from the slideshow display device 100 or the storage server device 300. The storage section 220 is the one for storing various kinds of data which are acquired through the communication section 216. The control section 230 creates various kinds of data to be supplied to the slideshow display device 100 and transmits the created data to the slideshow display device.

As illustrated in FIG. 18, the control section 230 includes a communication managing section 231 (image data transmitting means), a thumbnail image generating section 232, and a script generating section 233. The communication managing section 231 manages images stored in the storage server device 300 album by album. More specifically, the communication managing section 231 generates album management information for each album and stores the generated album management information into the storage section 220. The album management information includes album attributes such as album ID, album title, creation date of album, and person who creates album. In addition, the album management information includes path information which specifies a place where various kinds of data required for slideshow display of the slideshow display device 100 are stored. More specifically, the album management information includes an image data group of images included in an album, an image data group of thumbnails corresponding to the respective images included in the album, and path information such as a thumbnail list view screen creation script and an image display screen creation script.

The image data of thumbnails are generated by the thumbnail image generating section 232 and stored in the storage section 220. Various kinds of scripts such as a thumbnail list view screen creation script and an image display screen creation script are generated by the script generating section 233 and stored in the storage section 220.

The communication managing section 231 receives various data acquisition requests transmitted from the slideshow display device 100. According to a received data acquisition request, the communication managing section 231 transmits to the slideshow display device 100 an image data group of images included in an album, an image data group of thumbnails corresponding to the respective images included in the album, a thumbnail list view screen creation script, and an image display screen creation script.

More specifically, upon receipt of the album information acquisition request, the communication managing section 231 reads from the storage section 220 album management information of an album having an album ID which is designated in the album information acquisition request. The communication managing section 231 reads image data of thumbnail image and a thumbnail list view screen creation script from the storage section 220 with reference to the album management information, and then transmits the read image and script as album information to the slideshow display device 100. Upon receipt of a target image acquisition request that requests acquisition of a target image to be displayed in the slideshow display device 100, the communication managing section 231 reads image data of the target image from the storage server device 300 with reference to album management information, and then transmits the read image data to the slideshow display device 100. In a case where an image display screen creation script is used to display a target image, the communication managing section 231 reads an image display screen creation script corresponding to the target image from the storage section 220 with reference to the album management information, and then transmits the image display screen creation script and the image data of the target image to the slideshow display device 100.

Note that a more specific method of processing various scripts in the present embodiment is disclosed in Japanese PCT National Phase Unexamined Patent Publication No. 343683/2004 (Tokukai 2004-343683), for example.

(Note)

The present invention is not limited to the description of the embodiments above, but may be altered by a skilled person within the scope of the claims. An embodiment based on a proper combination of technical means disclosed in different embodiments is encompassed in the technical scope of the present invention.

For example, in the above-mentioned embodiment, the slideshow display device 100 is arranged so as to display image data acquired from the relay server device 200. However, the present invention is not limited to this arrangement. That is, a technical scope of the present invention includes, for example, an image display device which includes image data storing means storing sets of image data of an image group consisting of a plurality of images, and displays the sets of image data of the image group stored in the image data storing means in succession while changing the image data. For example, such an image display device can be realized by replacing the process of acquiring image data from the relay server device 200 in the above-mentioned embodiment, by a process of reading image data from the image data storing means. In such an image display device, it is preferable that the image display device includes a block having the same function as the function of the thumbnail image generating section 231, which is included in the relay server device 200.

Finally, the blocks included in the control section 110 of the slideshow display device 100 may be realized by hardware logic or may be realized by software by means of a CPU as follows.

That is, the slideshow display device 100 includes a CPU (central processing unit) that executes the order of an image display program for realizing the aforesaid functions, ROM (read only memory) that stores the image display program, RAM (random access memory) that develops the image display program in executable form, and a storage device (storage medium), such as memory, that stores the image display program and various types of data therein. With this arrangement, the object of the present invention is realized by a predetermined storage medium. The storage medium stores, in computer-readable manner, program codes (executable code program, intermediate code program, and source program) of the image display program of the slideshow display device 100, which is software for realizing the aforesaid functions. The storage medium is provided to the slideshow display device 100. With this arrangement, the slideshow display device 100 (alternatively, CPU or MPU) as a computer reads out and executes program code stored in the storage medium provided.

The storage medium may be tape based, such as a magnetic tape or cassette tape; disc based, such as a magnetic disk including a Floppy® disc and hard disk and optical disk including CD-ROM, MO, MD, DVD, and CD-R; card based, such as an IC card (including a memory card) and an optical card; or a semiconductor memory, such as a mask ROM, EPROM, EEPROM, and a flash ROM.

Further, the slideshow display device 100 may be arranged so as to be connectable to a communications network so that the program code is supplied to the slideshow display device 100 through the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

The blocks included in the control section 230 of the relay server device 200 may be realized by hardware logic or may be realized by software by means of a CPU as in the case of the slideshow display device 100.

As described above, an image display device of the present invention is an image display device which displays images in succession on a display section while changing the images, the images being included in an image group, the image display device including: display control means causing the display section to display thereon a list of all or part of reduced images of a reduced image group, which reduced images correspond to the respective images of the image group, when a display timing at which a target image other than a currently displayed image of the image group is to be displayed comes before a given point in time.

Further, as described above, an image display method of the present invention is an image display method of displaying images in succession on a display section while changing the images, the images being included in an image group, the image display method including: a reduced image list display step of causing the display section to display thereon a list of all or part of reduced images of a reduced image group, which reduced images correspond to the respective images of the image group, when a display timing at which a target image other than a currently displayed image of the image group is to be displayed comes before a given point in time.

When a display timing at which a target image other than a currently displayed image of the image group is to be displayed comes before a given point in time, all or part of the reduced images can be displayed in list view on the display section, instead of the target image to be displayed at the display timing. Thus, when the target image to be displayed at the display timing is not ready to be displayed, the above arrangement does not make the user wait without doing anything. Therefore, according to the above arrangement, it is possible to reduce stress to which the user is subject when the target image to be displayed at the display timing cannot be displayed.

In addition, it is possible to present to the user especially the reduced image group corresponding to the image group, instead of the target image to be displayed. For example, display of the reduced image group in list view can be used to cause the user to select a desired image from among the image group.

The present invention can be applied to an image display device which displays a plurality of images in succession. Particularly, the present invention can be preferably applied to an image display device which acquires an image to be displayed from an external entity and displays the acquired image.

The image display device of the present invention is preferably the one that further includes: image display instruction accepting means accepting an image display instruction from a user who gives an instruction to display the target image, the display timing being (i) a point in time when the image display instruction accepting means accepts the image display instruction or (ii) a point in time when the image display instruction accepting means accepts the image display instruction a given number of times within a predetermined time period.

The user gives the image display device the image display instruction with expectation that the target image will be displayed. Then, the image display instruction accepting means of the image display device accepts the image display instruction. Here, if the image display device is not ready to display the target image to be displayed when the image display device accepts the image display instruction before the given point in time, the image display device cannot display the target image to meet user's expectation. As a result of this, the user suffers from stress.

According to the above arrangement, the image display device causes the display section to display the reduced image group thereon in list view when accepting the image display instruction before the given point in time. This solves the problem that the user is kept waiting until the target image is displayed when the image display device is not ready to display the target image to be displayed.

The user who views a plurality of images displayed in succession on the image display device may positively perform the operation for instructing the image display device to display a target image other than the currently displayed image. This is not only because the user wants to view the target image itself, but also because the user wants to check the image group in a short time to find a desired image. In such a case, the user tends to give the instruction for causing the image display device to display an image other than the currently displayed image a plurality of times in a short time. For example, the user presses a right button repeatedly.

According to the above arrangement, the image display device displays the reduced image group in list view on the display section even when the image display device accepts the image display instruction a given number of times within a predetermined time period. This allows the user to immediately find a desired image. That is, the above arrangement further brings about the effect of allowing the above-mentioned user to find a desired image without being subject to stress.

Note that the predetermined time period and the given number of times are, for example, three times per second. These values can be set appropriately to provide a better operating comfort for the user. The display timing determined as a point in time when the image display instruction accepting means accepts the image display instruction a given number of times within a predetermined time period can be determined for example as follows. That is, the number of times the image display instruction is accepted is counted in a time period between a point t0 in time when the image display instruction was first accepted and a point t0+Δt in time when the predetermined time period Δt elapses. The display timing may be a point t1 in time when the number of times the image display instruction is accepted reaches the given number of times. Alternatively, the display timing may be the point t0+Δt in time if the number of times the image display instruction is accepted reaches the given number of times at the point t0+Δt when the predetermined time period Δt elapses.

The image display device of the present invention preferably further includes: image display instruction accepting means accepting an image display instruction from a user who gives an instruction to display the target image, the display timing being (i) a point in time when the image display instruction accepting means accepts the image display instruction after a predetermined waiting time has elapsed since display of the currently displayed image was started or (ii) a point in time when the image display instruction accepting means accepts the image display instruction a given number of times within a predetermined time period after a predetermined waiting time has elapsed since display of the currently displayed image was started.

The user gives the image display device the image display instruction with expectation that the target image will be displayed. Then, the image display instruction accepting means of the image display device accepts the image display instruction. Here, if the image display device is not ready to display the target image to be displayed when the image display device accepts the image display instruction before the given point in time, the image display device cannot display the target image to meet user's expectation. As a result of this, the user suffers from stress.

According to the above arrangement, the image display device causes the display section to reduced image group thereon in list view when accepting the image display instruction before the given point in time. This solves the problem that the user is kept waiting until the target image is displayed when the image display device is not ready to display the target image to be displayed.

The user who views a plurality of images displayed in succession on the image display device may positively perform the operation for instructing the image display device to display a target image other than the currently displayed image. This is not only because the user wants to view the target image itself, but also because the user wants to check the image group in a short time to find a desired image. In such a case, the user tends to give the instruction for causing the image display device to display an image other than the currently displayed image a plurality of times in a short time. For example, the user presses a right button repeatedly.

According to the above arrangement, the image display device displays the reduced image group in list view on the display section even when the image display device accepts the image display instruction a given number of times within a predetermined time period. This allows the user to immediately find a desired image. That is, the above arrangement further brings about the effect of allowing the above-mentioned user to find a desired image without being subject to stress.

In addition, according to the above arrangement, even though the image display device accepts the image display instruction, the display control means does not display the reduced image group in list view until a predetermined waiting time has elapsed since display of the currently displayed image was started. Therefore, until the waiting time elapses, the reduced image group is not unexpectedly presented to the user who gave the image display instruction to the slideshow display device with the intension of causing the target image other than the currently displayed image to be displayed. This makes it possible to stop a possible decreased usability caused by display of the reduced image group in list view.

Note that the predetermined time period and the given number of times are, for example, three times per second. These values can be set appropriately to provide a better operating comfort for the user. The display timing determined as a point in time when the image display instruction accepting means accepts the image display instruction a given number of times within a predetermined time period can be determined for example as follows. That is, the number of times the image display instruction is accepted is counted in a time period between a point t0 in time when the image display instruction is first accepted after a predetermined waiting time has elapsed since display of the currently displayed image was started and a point t0+Δt in time when the predetermined time period Δt elapses. The display timing may be a point t1 in time when the number of times the image display instruction is accepted reaches the given number of times. Alternatively, the display timing may be the point t0+Δt in time if the number of times the image display instruction is accepted reaches the given number of times at the point t0+Δt when the predetermined time period Δt elapses.

In the image display device of the present invention, it is preferable that the given point in time is a point in time when an image to be displayed next to a currently displayed image gets ready to be displayed on the display section.

According to the above arrangement, when a display timing at which an image other than a currently displayed image is to be displayed comes before an image to be displayed next to the currently displayed image gets ready to be displayed on the display section, the image display device can cause the display section to display thereon a list of all or part of the reduced images, instead of displaying the image to be displayed. Thus, when the display timing comes before the image to be displayed next to the currently displayed image gets ready to be displayed, the image display device does not make the user wait without displaying anything on the display section. Therefore, the above arrangement brings about the effect of reducing stress to which the user is subject when the image to be displayed at the display timing cannot be displayed.

It is preferable that the image display device of the present invention further includes target image acquiring means for acquiring image data of the target image from an external entity, and the given point in time is a point in time when the target image acquiring means completes acquisition of image data of the target image.

According to the above arrangement, instead of the target image, the reduced image group is displayed in list view in a case where it takes time to complete acquisition of the target image for the reason that data size of the target image is large or other reason. This solves the problem that the user is kept waiting until acquisition of the target image is completed.

It is preferable that the image display device of the present invention further includes: target image data expanding means expanding image data of the target image into a displayable form, and the given point in time is a point in time when the target image data expanding means completes expansion of image data of the target image.

According to the above arrangement, instead of the target image, the reduced image group is displayed in list view in a case where it takes time to complete expansion of the target image for the reason that the target image is in a compressed state or other reason. This solves the problem that the user is kept waiting until acquisition of the target image is completed.

It is preferable that the image display device of the present invention further includes: reduced image acquiring means acquiring image data of the reduced images to be displayed in list view, in advance from an external entity before the display timing.

According to the above arrangement, image data of the reduced images to be displayed in list view before the display timing at which the target image is to be displayed. In displaying the reduced images in list view on the display section instead of displaying the target image, the reduced image group can be immediately displayed in list view without display delay of the amount of time required for acquisition of the reduced images. That is, the above arrangement further brings about the effect of reducing stress to which the user can be subject in displaying the reduced image group in list view.

It is preferable that the image display device of the present invention further includes: list view screen creating means creating a list view screen to be displayed on the display section at the list view display, in advance before the display timing.

According to the above arrangement, the list view screen is created before the display timing at which the target image is to be displayed. In displaying the reduced images in list view on the display section instead of displaying the target image, the reduced images can be immediately displayed in list view without display delay of the amount of time required for creation of the list view screen. That is, the above arrangement further brings about the effect of reducing stress to which the user can be subject in displaying the reduced image group in list view.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image display device which displays images in succession on a display section while changing the images, the images being included in an image group, the image display device comprising:

display control means causing the display section to display thereon a list of all or part of reduced images of a reduced image group, which reduced images correspond to the respective images of the image group, when a display timing at which a target image other than a currently displayed image of the image group is to be displayed comes before a given point in time; and image display instruction accepting means accepting an image display instruction from a user who gives an instruction to display the target image, the display timing being (i) a point in time when the image display instruction accepting means accepts the image display instruction after a predetermined waiting time has elapsed since display of the currently displayed image was started or (ii) a point in time when the image display instruction accepting means accepts the image display instruction a given number of times within a predetermined time period after a predetermined waiting time has elapsed since display of the currently displayed image was started, and the given point in time being a point in time when the target image gets ready to be displayed on the display section.

2. The image display device according to claim 1, further comprising:

reduced image acquiring means acquiring image data of the reduced images to be displayed in list view, in advance from an external entity before the display timing.

3. The image display device according to claim 1, further comprising:
  list view screen creating means creating a list view screen to be displayed on the display section at the list view display, in advance before the display timing.

4. An image data transmitting device which transmits image data to an image display device, the image display device being an image display device which displays images in succession on a display section while changing the images, the images being included in an image group, the image display device comprising: display control means causing the display section to display thereon a list of all or part of reduced images of a reduced image group, which reduced images correspond to the respective images of the image group, when a display timing at which a target image other than a currently displayed image of the image group is to be displayed comes before a given point in time; and image display instruction accepting means accepting an image display instruction from a user who gives an instruction to display the target image,
  the display timing being (i) a point in time when the image display instruction accepting means accepts the image display instruction after a predetermined waiting time has elapsed since display of the currently displayed image was started or (ii) a point in time when the image display instruction accepting means accepts the image display instruction a given number of times within a predetermined time period after a predetermined waiting time has elapsed since display of the currently displayed image was started, and
  the given point in time being a point in time when the target image gets ready to be displayed on the display section,
  the image data transmitting device comprising:
  image data transmitting means transmitting to the image display device image data of the target image and image data of the reduced images to be displayed in list view.

5. An image display system comprising:
  an image display device being an image display device which displays images in succession on a display section while changing the images, the images being included in an image group, the image display device comprising: display control means causing the display section to display thereon a list of all or part of reduced images of a reduced image group, which reduced images correspond to the respective images of the image group, when a display timing at which a target image other than a currently displayed image of the image group is to be displayed comes before a given point in time; and
  an image data transmitting device transmitting to the image display device image data of the target image and image data of the reduced images to be displayed in list view,
  the image display device further comprising image display instruction accepting means accepting an image display instruction from a user who gives an instruction to display the target image,
  the display timing being (i) a point in time when the image display instruction accepting means accepts the image display instruction after a predetermined waiting time has elapsed since display of the currently displayed image was started or (ii) a point in time when the image display instruction accepting means accepts the image display instruction a given number of times within a predetermined time period after a predetermined waiting time has elapsed since display of the currently displayed image was started, and
  the given point in time being a point in time when the target image gets ready to be displayed on the display section.

6. An image display method performed by an image display device, of displaying images in succession on a display section while changing the images, the images being included in an image group,
  the image display method comprising:
  a reduced image list display step of causing the display section to display thereon a list of all or part of reduced images of a reduced image group, which reduced images correspond to the respective images of the image group, when a display timing at which an image other than a currently displayed image is to be displayed comes before a given point in time,
  the image display device comprising image display instruction accepting means accepting an image display instruction from a user who gives an instruction to display the target image,
  the display timing being (i) a point in time when the image display instruction accepting means accepts the image display instruction after a predetermined waiting time has elapsed since display of the currently displayed image was started or (ii) a point in time when the image display instruction accepting means accepts the image display instruction a given number of times within a predetermined time period after a predetermined waiting time has elapsed since display of the currently displayed image was started, and
  the given point in time being a point in time when the target image gets ready to be displayed on the display section.

7. A non-transitory computer-readable storage medium storing therein an image display program for causing a computer to operate as an image display device which displays images in succession on a display section while changing the images, the images being included in an image group, the image display program being a program for causing the computer to function as display control means causing the display section to display thereon a list of all or part of reduced images of a reduced image group, which reduced images correspond to the respective images of the image group, when a display timing at which a target image other than a currently displayed image of the image group is to be displayed comes before a given point in time,
  the image display device comprising image display instruction accepting means accepting an image display instruction from a user who gives an instruction to display the target image,
  the display timing being (i) a point in time when the image display instruction accepting means accepts the image display instruction after a predetermined waiting time has elapsed since display of the currently displayed image was started or (ii) a point in time when the image display instruction accepting means accepts the image display instruction a given number of times within a predetermined time period after a predetermined waiting time has elapsed since display of the currently displayed image was started, and
  the given point in time being a point in time when the target image gets ready to be displayed on the display section.

* * * * *